(12) United States Patent
Kaneko et al.

(10) Patent No.: US 9,509,913 B2
(45) Date of Patent: Nov. 29, 2016

(54) IMAGE PICKUP APPARATUS, METHOD OF CONTROLLING IMAGE PICKUP APPARATUS, IMAGE PICKUP APPARATUS SYSTEM, AND IMAGE PICKUP CONTROL PROGRAM STORED IN STORAGE MEDIUM OF IMAGE PICKUP APPARATUS

(71) Applicant: Olympus Corporation, Hachioji-shi, Tokyo (JP)

(72) Inventors: Tetsuya Kaneko, Hachioji (JP); Takashi Gando, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/302,841

(22) Filed: Jun. 12, 2014

(65) Prior Publication Data
US 2014/0368719 A1 Dec. 18, 2014

(30) Foreign Application Priority Data

Jun. 18, 2013 (JP) .................................. 2013-127669
Jun. 18, 2013 (JP) .................................. 2013-127670

(51) Int. Cl.
*H04N 5/232* (2006.01)
(52) U.S. Cl.
CPC ...... *H04N 5/23293* (2013.01); *H04N 5/23216* (2013.01); *H04N 5/23296* (2013.01)
(58) Field of Classification Search
CPC .................. H04N 5/23216; H04N 5/23293; H04N 5/23296
USPC .............. 348/240.3, 240.99, 333.02, 333.03, 348/345–349
See application file for complete search history.

(56) References Cited

U.S. PATENT DOCUMENTS 7,324,151 B2 * 1/2008 Onozawa ........... H04N 5/23212
348/333.02
8,350,945 B2 * 1/2013 Yumiki .................. G02B 7/021
348/333.02

(Continued)

FOREIGN PATENT DOCUMENTS

CN 101802705 8/2010
CN 101848338 9/2010

(Continued)

OTHER PUBLICATIONS

Chinese Office Action to corresponding Chinese Patent Application No. 201410268498.X, mailed on Feb. 22, 2016 (7 pgs.).

(Continued)

*Primary Examiner* — Lin Ye
*Assistant Examiner* — Chriss Yoder, III
(74) *Attorney, Agent, or Firm* — John C. Pokotylo; Straub & Pokotylo

(57) ABSTRACT

An image pickup apparatus that can easily perform electric fine zoom adjustment, includes an image pickup section that can change an image pickup parameter, a display section that visibly displays an image signal outputted from the image pickup section, a rotational operation member that performs a change operation to the image pickup parameter, a parameter control section that controls the image pickup parameter, and a display control section that displays an effect of the change of the image pickup parameter in accordance with the rotational operation of the rotational operation member on the display section, while superimposing the effect on the image signal outputted from the image pickup section.

14 Claims, 20 Drawing Sheets

(56) References Cited

U.S. PATENT DOCUMENTS

| | | | |
|---|---|---|---|
| 8,363,126 B2 | 1/2013 | Kurokawa | |
| 8,416,306 B2* | 4/2013 | Yun | H04N 5/23216 348/208.12 |
| 2005/0270410 A1* | 12/2005 | Takayama | H04N 5/23212 348/345 |
| 2006/0029381 A1* | 2/2006 | Onozawa | G03B 13/16 396/147 |
| 2007/0285528 A1* | 12/2007 | Mise | H04N 5/23212 348/222.1 |

FOREIGN PATENT DOCUMENTS

| | | |
|---|---|---|
| CN | 103139453 | 6/2013 |
| JP | 2004-093622 | 3/2004 |
| JP | 2010-117444 | 5/2010 |

OTHER PUBLICATIONS

Office Action to corresponding Japanese Patent Application No. 2013-127670, mailed on Sep. 6, 2016.

* cited by examiner

IMAGE PICKUP APPARATUS, METHOD OF CONTROLLING IMAGE PICKUP APPARATUS, IMAGE PICKUP APPARATUS SYSTEM, AND IMAGE PICKUP CONTROL PROGRAM STORED IN STORAGE MEDIUM OF IMAGE PICKUP APPARATUS

CROSS REFERENCE TO RELATED APPLICATION

This application claims the benefit of Japanese Application No. 2013-127669 filed in Japan on Jun. 18, 2013, and Japanese Application No. 2013-127670 filed in Japan on Jun. 18, 2013, the contents of which are incorporated herein by this reference.

BACKGROUND OF THE INVENTION

1. Field of the Invention

The present invention relates to an image pickup apparatus that includes a ring-shaped rotational operation member and performs a control switch in an action mode, a method of controlling the image pickup apparatus, an image pickup apparatus system including the above image pickup apparatus, and an image pickup control program that is stored in a storage medium of the image pickup apparatus.

2. Description of the Related Art

Image pickup apparatuses such as cameras for picking up a still image or a movie have been put into practical use and are widely and generally used, each of which includes a lens barrel having an image pickup optical system for forming an object image. These types of conventional image pickup apparatuses have been constantly required to be downsized in order to be convenient for carrying about, and there has been a growing trend toward multifunctionality in recent years, in order to handle various image pickup situations.

For example, this type of conventional image pickup apparatus includes a plurality of drive mechanism sections for driving each of a plurality of optical lenses configuring the image pickup optical system depending on purposes as appropriate, and performs a drive control to the plurality of drive mechanisms to achieve a zooming function, a focus adjusting function, and the like. In addition, a ring-shaped rotational operation member is provided in a body of the image pickup apparatus, an exterior portion of the lens barrel, or the like such that a user freely performs these various functions at the user's request. Then, this ring-shaped rotational operation member is used for a zoom control or a focus control, as well as used for changing an image pickup parameter to change an effect in picking up an image, such as an f number, a shutter speed value, an exposure compensation value, a white balance, and an image processing parameter setting.

Hence, with respect to the conventional image pickup apparatuses, whereas there are increasing demands for items to be operated, quick operations, coarse adjustment or fine adjustment, and the like, it becomes difficult to understand which control is to be performed by which operation.

Thus, for the lens barrels in the conventional image pickup apparatuses, instead of conventional annular-shaped turning operation members, various proposals have been put forth by, for example, Japanese Patent Laid-Open Publication No. 2010-117444, with respect to an operation member having a form different from the conventional operation members.

A lens barrel in an image pickup apparatus disclosed by the above Japanese Patent Laid-Open Publication No. 2010-117444 includes a touchpad disposed therein as an operation member to be provided on the lens barrel, instead of the conventional form of turning operation members, so as to increase freedom of design.

SUMMARY OF THE INVENTION

An image pickup apparatus of one aspect of the present invention includes an image pickup section that can change an image pickup parameter, a display section that visibly displays an image signal outputted from the above image pickup section, a rotational operation member that performs change operation to the image pickup parameter, a parameter control section that controls the image pickup parameter, and a display control section that displays an effect of the change of the image pickup parameter in accordance with an rotational operation of the rotational operation member on the display section while superimposing the effect on the image signal outputted from the image pickup section.

In a method of controlling an image pickup apparatus of another aspect of the present invention, an image pickup section obtains an image signal having an image pickup parameter that is changed as appropriate, a display section visibly displays the image signal outputted from the above image pickup section, a rotational operation member outputs a change instruction signal to change the image pickup parameter in accordance with an operation, a parameter control section controls the image pickup parameter outputted from the rotational operation member, a display control section displays an effect of a change of the image pickup parameter in accordance with a rotational operation of the rotational operation member on the display section while superimposing the effect on the image signal outputted from the image pickup section.

An image pickup apparatus system of still another aspect of the present invention includes an image pickup section that can change an image pickup parameter, a display section that visibly displays an image signal outputted from the image pickup section, a rotational operation member that performs change operation to the image pickup parameter, a parameter control section that controls the image pickup parameter, a display control section that displays an effect of the image pickup parameter in accordance with the rotational operation of the rotational operation member on the display section while superimposing the effect on the image signal outputted from the image pickup section.

In an image pickup control program stored in a storage medium of the image pickup apparatus of still another aspect of the present invention, an image pickup section obtains an image signal having an image pickup parameter that is changed as appropriate, a display section visibly displays the image signal outputted from the image pickup section, a rotational operation member outputs a change instruction signal in accordance with an operation to change the image pickup parameter, a parameter control section controls the image pickup parameter in accordance with a change instruction output from the rotational operation member, a display control section performs a display control including an effect of the change of the image pickup parameter in accordance with the rotational operation of the rotational operation member by superimposing the effect on the image signal outputted from the image pickup section, so as to perform an image display on the display section.

Combination of these inventions forms a user interface that performs an auxiliary display on the display section that can perform various electrical auxiliary displays using the ring-shaped rotational operation member, and that has user-friendly operation guidance. That is, the user interface includes an image pickup section that can change an image pickup parameter (zooming, focusing, or the like. In addition, the zooming can be performed in both optical zooming and electronic zooming), rotational operation members (ring shape operation members on a lens barrel side and an operation member such as of a dial type on a body side), a display section (liquid crystal display panel, organic EL panel, electronic viewfinder or the like) that visibly displays an image signal outputted from the image pickup section, an optical system control section that controls the image pickup parameter, and a display control section that displays an effect of change of the image pickup parameter in accordance with the rotational operation on the display section while superimposing the effect on the image signal outputted from the image pickup section (by which controls are performed such that a zooming range, focus adjustment state, and the like are displayed to allow a user to check the display and intuitively operate a rotational operation section).

As long as the rotational operation section allows for a rotational operation using an image pickup direction or an observation direction as a rotation center, a display can be made such that a rotation position of the operation corresponds to which position as a two-dimensional coordinate on a surface of the display section, which redoubles visual confirmation effect.

The advantages of the present invention will be more apparent from the following detailed description.

BRIEF DESCRIPTION OF THE DRAWINGS

FIG. 27 is a diagram showing one example of the live view image in the focus guide mode in the image pickup apparatus (camera) of the fourth embodiment of the present invention, and showing a state where an object in a short-distance view is focused on;

FIG. 28 is a diagram showing one example of the live view image in the focus guide mode in the image pickup apparatus (camera) of the fourth embodiment of the present invention, and showing a state where an object in a middle-distance view is focused on; and FIG. 29 is a diagram showing one example of the live view image in the focus guide mode in the image pickup apparatus (camera) of the fourth embodiment of the present invention, and showing a state where an object in a long-distance view is focused on.

DETAILED DESCRIPTION OF THE PREFERRED EMBODIMENTS

Figure 1:
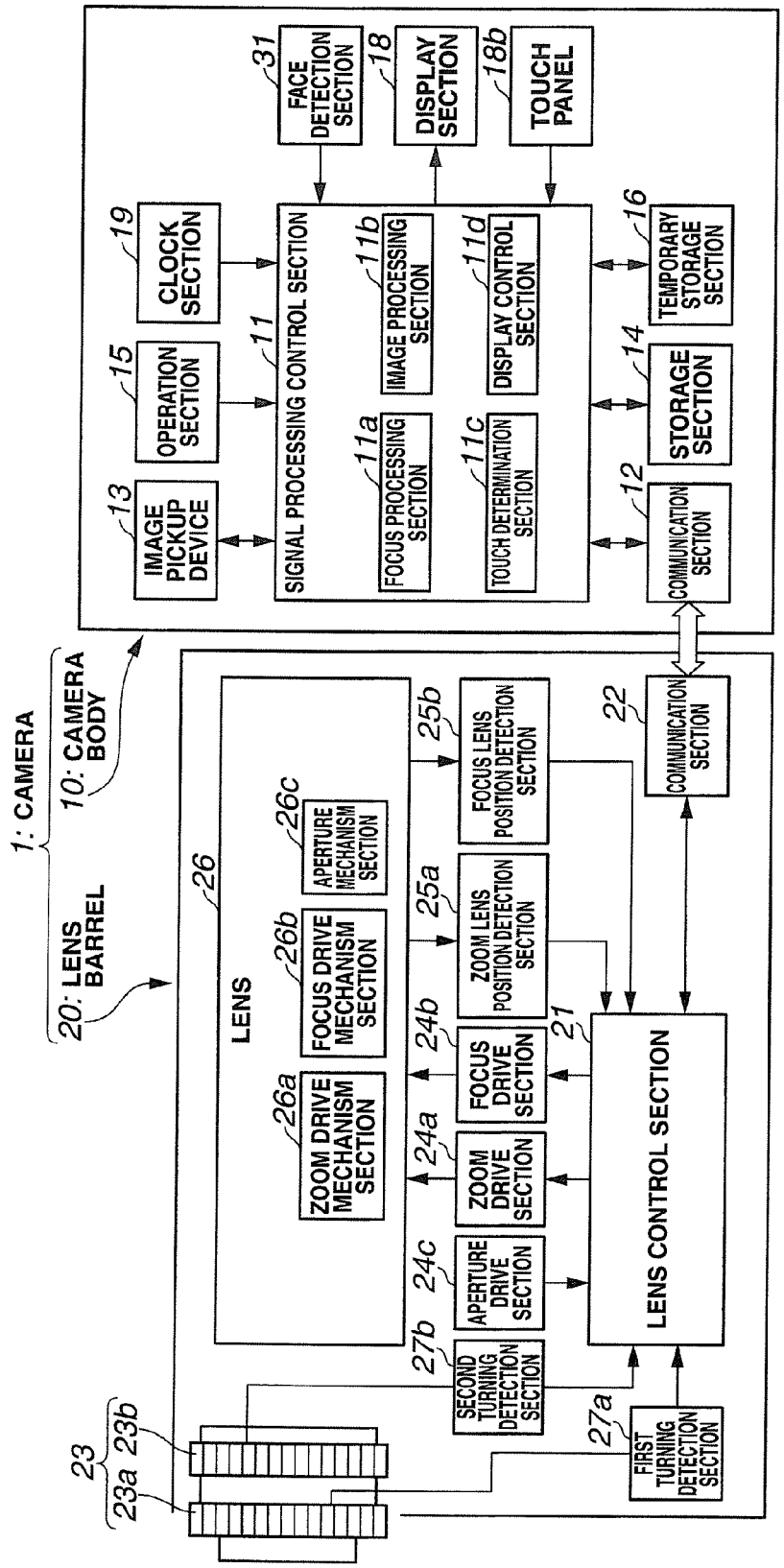
FIG. 1 is a block configuration diagram showing a schema of a primary internal configuration of an image pickup apparatus (camera) of a first embodiment of the present invention.

The present invention will be described below with reference to embodiments shown in the drawings. In the respective drawings used in the following descriptions, the respective components may be shown in scales varying from one component to another to illustrate the respective components in sizes that are recognizable in the drawings. Therefore, the quantity of the components, shapes of the components, size ratio among the components and relative positional relationships among the components in the present invention are not exclusively limited to the illustrated aspects.

The respective embodiments of the present invention to be described below exemplify the case where the present invention is applied to an image pickup apparatus (camera) configured such that, for example, a photoelectric conversion is performed to an optical image (object image) formed by an image pickup optical system constituted by an optical lens or the like using a solid state image pickup device, an image signal obtained as a result of this photoelectric conversion processing is converted into digital image data representing a still image or a movie, the image data is stored in a storage medium, and the still image or the movie can be displayed using a display device based on the digital image data stored in the storage medium.

[First Embodiment]

A schematic configuration of an image pickup apparatus of a first embodiment of the present invention (hereafter, merely referred to as a camera) will be first described. FIG. 1 is a block configuration diagram showing a schema of a primary internal configuration of an image pickup apparatus (camera) of a first embodiment of the present invention.

A camera 1 of the present embodiment is constituted by, as shown in FIG. 1, a camera body 10 and a lens barrel 20. The camera 1 is a so-called interchangeable lens camera in which the lens barrel 20 is configured to be detachable with respect to the camera body 10. Although, in the present embodiment, an interchangeable lens camera is described by way of an example as an image pickup apparatus, cameras as image pickup apparatuses to which the present invention can be applied are not limited to this form, and the present invention can be applied similarly, for example, fixed lens cameras of a form in which the camera body 10 and the lens barrel 20 are integrally configured.

The camera body 10 includes a signal processing control section 11, a body-side communication section 12, an image pickup device 13, a storage section 14, an operation section 15, a temporary storage section 16, a display section 18, a touch panel 18b, a clock section 19, a face detection section 31, and the like.

The signal processing control section 11 is a circuit section that has a function as a control section for generally controlling operations of the entire camera 1 and processes a control signal to control various configuration units, and that has a function as a signal process section for performing image signal processing or the like to an image signal (image data) obtained by the image pickup device 13.

The signal processing control section 11 includes therein various circuit sections such as a focus processing section 11a, an image processing section 11b, a touch determination section 11c, and a display control section 11d.

Among these circuit sections, the focus processing section 11a is a circuit section for receiving the image signal outputted from the image pickup device 13 to perform a contrast detection or the like, and for performing image signal processing such as focus adjustment processing, focus position determination, and distance determination (distance measurement) processing.

The image processing section 11b is a process circuit section for performing various image processing based on the image data obtained by the image pickup device 13.

The touch determination section 11c is a signal process circuit for receiving an instruction input signal from the touch panel 18b to determine instruction contents thereof. For example, when a user performs a touch operation, a slide operation, or the like with respect to a position on the touch panel 18b corresponding to a displayed icon display or the like while the icon display or the like is displayed on a displayed image in the display section 18, the touch determination section 11c determines these operations. Determination result from the touch determination section 11c is transmitted to the signal processing control section 11, and the signal processing control section 11 then receives the determination result to perform control processing corresponding to the displayed icon display or the like.

The display control section 11d is a control circuit section for driving and controlling the display section 18. The display control section 11d receives image data (image signal) that is generated and obtained by an image pickup section constituted by the image pickup device 13, a lens 26

(to be described hereafter), and the like, and performs control to visibly display the image data on the display panel of the display section 18.

Here, the image pickup section is a unit including the lens 26 and the like (to be described hereafter) that is an image pickup optical system for allowing light from a subject (object) as an image pickup target to pass therethrough to form an optical image of the object, and the image pickup device 13 that receives the object image formed by the lens 26 to perform photoelectric conversion processing.

To the image pickup device 13, for example, photoelectric conversion elements being solid state image pickup devices such as CCD image sensors that use circuit elements such as CCDs (charge coupled devices), and MOS image sensors that use MOSs (metal oxide semiconductor) are applied. An analog image signal generated by the image pickup device 13 is outputted to the focus processing section 11a and the image processing section 11b of the signal processing control section 11 and is subjected to various image signal processing.

The storage section 14 is a configuration section including a signal process circuit section for receiving an image signal that has been outputted from the image pickup device 13 and has been processed by the image processing section 11b, to convert the image signal into a predetermined form, a storage medium for storing image data generated by the signal process circuit section, a control section for driving and controlling the storage medium, and the like. Conversion processing of the image signal performed here includes, for example, processing in which signal compression processing or the like is performed to convert the image signal into a storage format of the image data, and signal processing to read the image data that has been stored in the storage medium and to perform expansion processing or the like to restore the image signal. Note that, the compression-expansion processing of this kind is not limited to a form that is performed by the signal process circuit section included in the storage section 14, and may be, for example, a form in which a similar signal process circuit section is provided, for example, in the signal processing control section 11, and the compression-expansion processing is performed by the signal process circuit section.

The temporary storage section 16 is a circuit section for temporarily storing the image data or the like obtained by the image pickup device 13, to which semiconductor memory elements such as EEPROMs (electrically erasable programmable read-only memory) and RAMs (random access memory) are applied, for example.

The operation section 15 is various operation members having forms of a normal push-button type, slide type, dial type or the like, which are provided to an exterior portion of the camera body 10 of the camera 1, and refers to an operational configuration section used for operations including typical various operation members such as a shutter release button (not specially shown). Note that, the operation members included in the operation section 15 include a so-called four-way directional operation member, for example. The four-way directional operation member is used also for, for example, selecting an item on the menu panel displayed on the display section 18, and pointing out a position on the displayed image. The four-way directional operation member functions as an operation member instead of the touch panel 18b to be described hereafter. An instruction signal from the four-way directional operation member is outputted to the signal processing control section 11, and is subjected to various controls by a control circuit in the signal processing control section 11.

In addition, the camera 1 of the present embodiment includes the touch panel 18b as an operation member for operation other than the operation section 15. The touch panel 18b is an operation member that is disposed on a display surface of the display section 18, and is configured such that a user performs the touch operation, the slide operation, or the like to a predetermined region corresponding to an image displayed on the display section 18, for example, a region equivalent to various icon display, to generate various operation instruction signals. The instruction input signal from the touch panel 18b is sent to the touch determination section 11c of the signal processing control section 11, and an operation input thereof is determined.

The display section 18 is controlled by the display control section 11d of the signal processing control section 11. That is, the display section 18 is a display unit for, for example, displaying a live view image based on the image data or the like that has been outputted from the image pickup device 13 and processed by the image processing section 11b of the signal processing control section 11, for reproducing and displaying an stored image based on the image data or the like that has been subjected to expansion processing by the storage section 14, and for displaying an icon, a menu panel and the like based on various icon data or the like that is prepared in the storage section 14 or the like in advance. The display section 18 includes a display panel such as an LCD (liquid crystal display), a PDP (plasma display), and an OEL (organic electro-luminescence display), and a drive circuit or the like therefor.

In other words, in the reproduction mode, the display section 18 serves as a display device, under a control of the display control section 11d, for reproducing and displaying an image based on the image data that has been picked up and stored, while the display section 18 serves as, in an image pickup mode, an electric view finder for continuing to display images in real-time successively and continuously based on the image data that has been outputted from the image pickup device 13 and processed through the image processing section 11b under control of the display control section 11d, so as to allow the user to observe and check the image pickup range. Note that, in the present embodiment, although the example is described in which the display panel of the display section 18 is provided on a back side of the camera body 10, the configuration example of the display section 18 is not limited to such a form. For example, a form may be employed in which the display section 18 is configured by a compact display panel that can be used as an EVF (electric view finder). Furthermore, a form may be employed which includes a display section disposed on a back side and a compact display section, both of which are used in a switching manner.

The clock section 19 is an internal clock of a computer that is so-called RTC (real-time clock). The clock section 19 is used for, for example, providing information on date and time of a data file or the like, or for clocking, performing time control, or the like in control processing.

The face detection section 31 is an object image detection circuit section that detects whether or not an image corresponding to an object such as a face of a human or specific kinds of plants and animals (e.g., a dog, a cat, a bird, or a flower) is present in an image displayed based on the image data outputted from the image pickup device 13. The face detection section 31 may include those that not only detect a face image but also, for example, perform color detection or pattern detection. Note that the signal processing control section 11 has a function of performing a control to track an image pattern of an object image detected by the face detection section 31 all the time, and to continue to focus on the image pattern even when the object image moves in an image pickup screen.

The body-side communication section 12 is a communication signal processing circuit section on the camera body 10 side that is electrically connected with a lens-side communication section 22 to be described hereafter to exchange a control signal, an information signal, or the like between the camera body 10 and the lens barrel 20.

Next, the lens barrel 20 is mainly configured by a lens control section 21, the lens-side communication section 22, a lens-side operation section 23, a zoom drive section 24a, a focus drive section 24b, an aperture drive section 24c, a zoom lens position detection section 25a, a focus lens position detection section 25b, a first turning detection section 27a, a second turning detection section 27b, the lens 26 being the image pickup optical system, and the like.

The lens control section 21 is a control section for controlling operations of respective configuration units on the lens barrel 20 side, under a control of the signal processing control section 11 on the camera body 10 side. Note that the lens barrel 20 can be configured without the lens control section 21. In this case, the signal processing control section 11 on the camera body 10 side may be configured to perform control on the lens barrel 20 side.

The lens-side communication section 22 is a communication signal processing circuit section on the lens barrel 20 side that is electrically connected to the body-side communication section 12 to exchange a control signal, an information signal, or the like between the lens barrel 20 and the camera body 10.

The lens-side operation section 23 is of various operation members provided on the lens barrel 20 side, and more specifically, for example, is of a focus ring 23a (first operation member, first operation ring) to manually perform a focus adjustment operation, a zoom ring 23b (second operation member, second operation ring) to manually perform a zooming operation. The two operation rings 23a and 23b are annular-shaped operation members each of which is formed into, for example, an annular shape (ring shape), disposed on an outer peripheral side of the lens barrel 20 in such a manner as to expose an outer peripheral surface thereof, and provided so as to turn about an optical axis of the lens 26 being the image pickup optical system of the lens barrel 20. In addition, the two operation rings 23a and 23b are provided in an optical axis direction in parallel, at positions close to each other.

That is, it can be said that the image pickup section, which can change the image pickup parameter, can perform focus adjustment and zoom adjustment. The image pickup section may also perform electronic zoom as well. In addition, the signal processing control section is provided as a parameter control section for controlling the image pickup parameter.

Although two operation rings are described, the number may be one, called a rotational operation member, and provided in the body. Furthermore, although the electric view finder is described, a liquid crystal display panel or an organic EL panel may be used, and a display section that visibly displays an image signal outputted from the image pickup section may be used. The display section can display the effect of the change of the image pickup parameter in accordance with the rotational operation superimposing the effect on the image signal outputted from the image pickup section, by the display control section. This allows a user to intuitively check with an eye a zoom range or a region to be brought into focus when the user changes the focus on the display, and to understand well how to operate the rotational operation section.

As described above, in the lens barrel 20 of the camera 1 of the present embodiment, one of the two operation rings 23a and 23b is described as the focus ring 23a and the other is described as the zoom ring 23b. Here, the focus ring 23a can infinitely rotate in forward and reverse directions about the optical axis of the lens 26. In contrast, the zoom ring 23b can turn within only a predetermined range about the optical axis of the lens 26 in forward and reverse directions. Furthermore, when the zoom ring 23b is caused to turn in one direction within the predetermined range, for example, a zooming toward a long-focus side is performed, and when the zoom ring 23b is caused to turn in the other direction within the predetermined range, for example, a zooming toward a short-focus side is performed. That is, the zoom ring 23b is configured to function as a zoom switch for turning on or off of a zoom action by the turning operation, and to perform desired zooming operations in accordance with the turning directions. Note that the zoom control and the zooming operation refer to a control and an operation for enlarging or reducing an object image formed by the image pickup optical system, that is, for scaling the object image.

In this case, the lens barrel 20 may be configured such that, when the zoom ring 23b is turned to, for example, an intermediate point of the predetermined range, within the predetermined range thereof in the one or the other direction, a switch of a first stage is turned on, and when the zoom ring 23b is further turned to an end point within the predetermined range (i.e., within an allowable turning range), a switch of a second stage is turned on. With such a configuration, it is possible to use a stage switch for performing a switch control of a zooming speed. In addition, since the number of the stages to be switched in this case can be freely set, the stage switch is not limited to have the two stages, and may be configured as a multistage switch of three stages or more.

Furthermore, the zoom ring 23b is not limited to the abovementioned configuration, and may be configured to infinitely rotate about the optical axis of the lens 26 in forward and reverse directions, as with the focus ring 23a.

The zoom control of the camera 1 of the present embodiment configured in such a manner starts as the zoom switch is brought into an on state by the turning operation of the zoom ring 23b. The zooming speed at this point in time is controlled in accordance with the amount of turning of the zoom ring 23b.

In addition, the zoom ring 23b is configured such that a predetermined position (neutral position) to be a reference is always maintained. Therefore, at the time of performing a zooming operation, the user performs the turning operation of the zoom ring 23b while observing a finder screen or the like of the display section 18. When the user releases a hand from the zoom ring 23b, for example, at the time when a desired framing is obtained by the turning operation of the zoom ring 23b, the zoom ring 23b returns to the original neutral position, and the zoom action is thereby brought into an off state. Such a zoom control is a power zoom control similar to that performed by ordinary conventional form of cameras. Such a conventional power zoom control is unsuitable for the fine zoom adjustment, and is used for performing a coarse adjustment operation in the present embodiment.

In addition to this, the camera 1 of the present embodiment has a fine zoom adjustment mode as an action mode in which a zoom range of a predetermined range is set within a settable zoom range (a range from a zoom end on the short-focus side up to a zoom end on the long-focus side), and a fine adjustment for a zoom setting can be performed in order to perform a minute zoom control within the set zoom range to set a strict framing. The fine zoom adjustment mode is a mode in which the minute zoom control is performed by performing the fine adjustment for the zoom setting using the other operation member, for example, the focus ring 23a, after setting a predetermined zoom range through a normal zooming operation using the zoom ring 23b and a touch operation on the display screen of the display section 18. That is, in the state where the zoom control is performed in the set fine zoom adjustment mode, the focus ring 23a is controlled so as to function also as an operation member different from the original operation member for the focusing operation, that is, an operation member for the fine zoom adjustment used for the fine zoom adjustment operation. An action in the fine zoom adjustment mode will be described in detail hereafter.

Note that, the lens-side operation section 23 except for the two operation rings 23a and 23b may include other operation members such as an operation member for switching the image pickup mode among a normal image pickup, a close image pickup, and the like, and a zoom switch for performing power zooming. Since these other operation members are a part that do not directly relate to the present invention, illustration and detailed description thereof will be omitted.

The first turning detection section 27a is a circuit section including sensors for converting an amount of rotation of the focus ring 23a (first operation ring), that is, an amount of a mechanical displacement of rotation of the operation ring into an electrical signal, and for processing the signal to detect a rotation direction or an amount of rotation. In addition, the second turning detection section 27b is a circuit section for detecting an amount of rotation of the zoom ring 23b (second operation ring) or an operation state such as on or off of a switch. To the first turning detection section 27a and the second turning detection section 27b, for example, rotary encoders are applied.

The zoom drive section 24a is a control circuit section, and is zoom control means, for performing zoom drive control of a zoom drive mechanism section 26a (to be described hereafter) in the lens 26 under a control of the lens control section 21. Likewise, the focus drive section 24b is a control circuit section, and is focus driving means, for performing a drive control of a focus drive mechanism section 26b (to be described hereafter) in the lens 26 under control of the lens control section 21. Note that, with respect to methods of focusing, the lens is not necessarily moved, and the image pickup device may be moved. Likewise, the aperture drive section 24c is a control circuit section for performing a drive control of an aperture drive mechanism section 26c (to be described hereafter) in the lens 26 under a control of the lens control section 21.

The zoom lens position detection section 25a is a position detection circuit for detecting a position on an optical axis of a zoom optical system. In addition, the focus lens position detection section 25b is a position detection circuit for detecting a position on an optical axis of a focus optical system. Note that the two position detection sections (25a and 25b) each include, for example, a switch or a photo-coupler for determining an initial position.

The lens 26 includes, as described above, an image pickup optical system that is constituted by a plurality of optical lenses and the like for allowing light from a subject (object) to be an image pickup target to pass therethrough to form an optical image of the object, a plurality of lens barrel members for holding the individual optical lenses of the image pickup optical system, a drive lens barrel for moving the plurality of lens barrel members individually forward and backward in an optical axis direction, as well as the zoom drive mechanism section 26a, the focus drive mechanism section 26b, the aperture drive mechanism section 26c and the like. Note that the image pickup optical system is configured by a plurality of optical lenses and includes, for example, the zoom optical system that contributes a zoom action (zooming), a focus optical system that contributes a focus adjustment action (focusing), and an optical system for correcting lens aberration.

The zoom drive mechanism section 26a is a drive unit including a drive source (actuator) for driving the zoom optical system of the image pickup optical system that is involved in the zoom action, a drive mechanism for transmitting driving force from the drive source, and the like.

The focus drive mechanism section 26b is a drive unit including a drive source (actuator) for driving the focus optical system, that is part of the image pickup optical system involved in a focus action, a drive mechanism for transmitting driving force from the drive source, and the like.

The aperture drive section 24c is a drive unit including a drive source (actuator) for driving an aperture mechanism that adjusts an amount of luminous flux passing through the image pickup optical system, and a drive mechanism for transmitting driving force from the drive source, and the like.

Note that the camera body 10 and the lens barrel 20 include, in addition to the abovementioned configuration sections, the other various configuration units and the like, but the various configuration units and the like are a configuration that does not directly relate to the present invention, and therefore detail description and illustration thereof are omitted assuming that the camera body 10 and the lens barrel 20 include various configuration units similar to the configuration of ordinary conventional cameras.

For example, although illustration and description is omitted with respect to a shutter mechanism for opening/closing an optical path of the image pickup optical system, and for adjusting the amount of luminous flux that passes through the image pickup optical system at the time of the image pickup action, the camera 1 of the present embodiment also includes a normal shutter mechanism similar to that of conventional cameras. The shutter mechanism may be a focal-plane shutter disposed on the camera body 10 side, and may be a leaf shutter disposed on the lens barrel 20 side. If the shutter mechanism is disposed on the camera body 10 side, the shutter mechanism is controlled mainly by the control sections on the body side. In addition, if the shutter mechanism is disposed on the lens barrel 20 side, the shutter mechanism is controlled mainly under the control of the control sections on the lens side via the lens control section 21.

Figure 2:
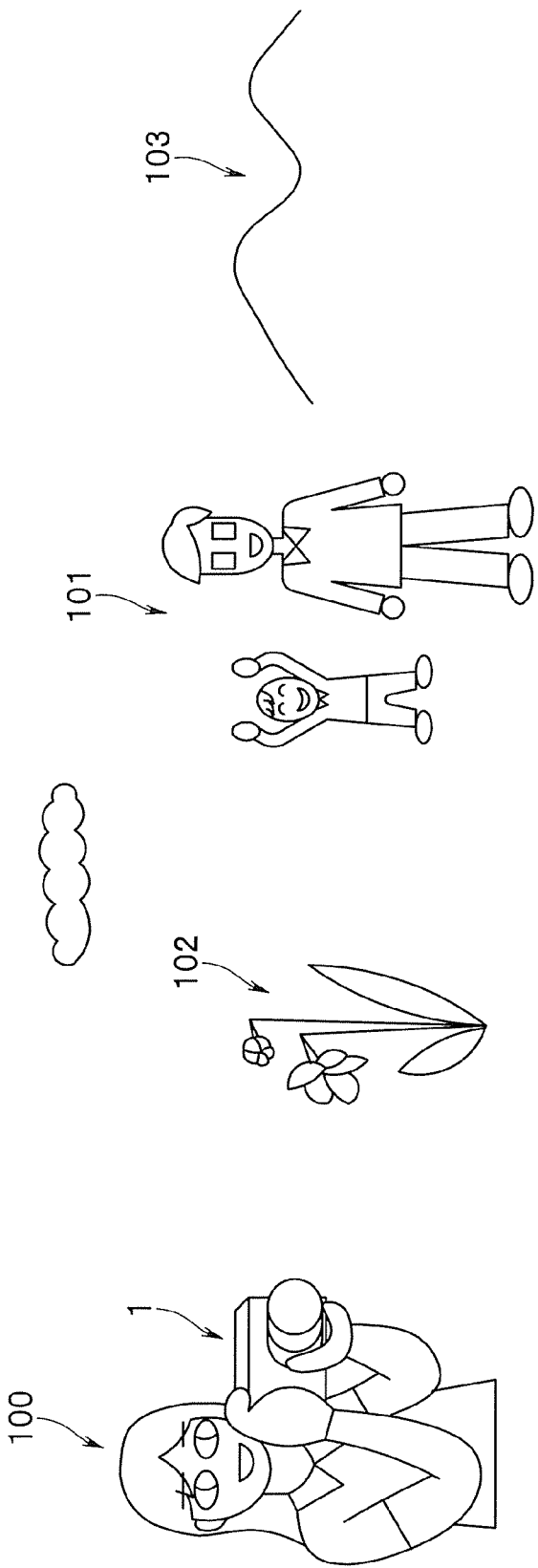
FIG. 2 is a schematic diagram of an image pickup situation at the time of performing image pickup using the image pickup apparatus (camera) of FIG. 1.

Actions at the time of performing image pickup using the camera 1 of the present embodiment that is configured in such a manner will be described below. FIG. 2 is a schematic diagram of an image pickup situation at the time of performing image pickup using the camera 1 of the present embodiment. A user 100 who holds the camera 1 of the present embodiment in the user's hand, as shown in FIG. 2, is about to pick up an image of a scene including two persons or the like 101 as a main image pickup target. In this case, an assumed situation is that, within an image pickup range of the camera 1, there are main image pickup targets 101 (middle-distance view), and relative to the main image pickup targets 101, a flower or the like 102 at a position (short-distance view) nearer to the user 100 and a mountain or the like 103 at a position further than the user 100 (long-distance view).

Figure 3:
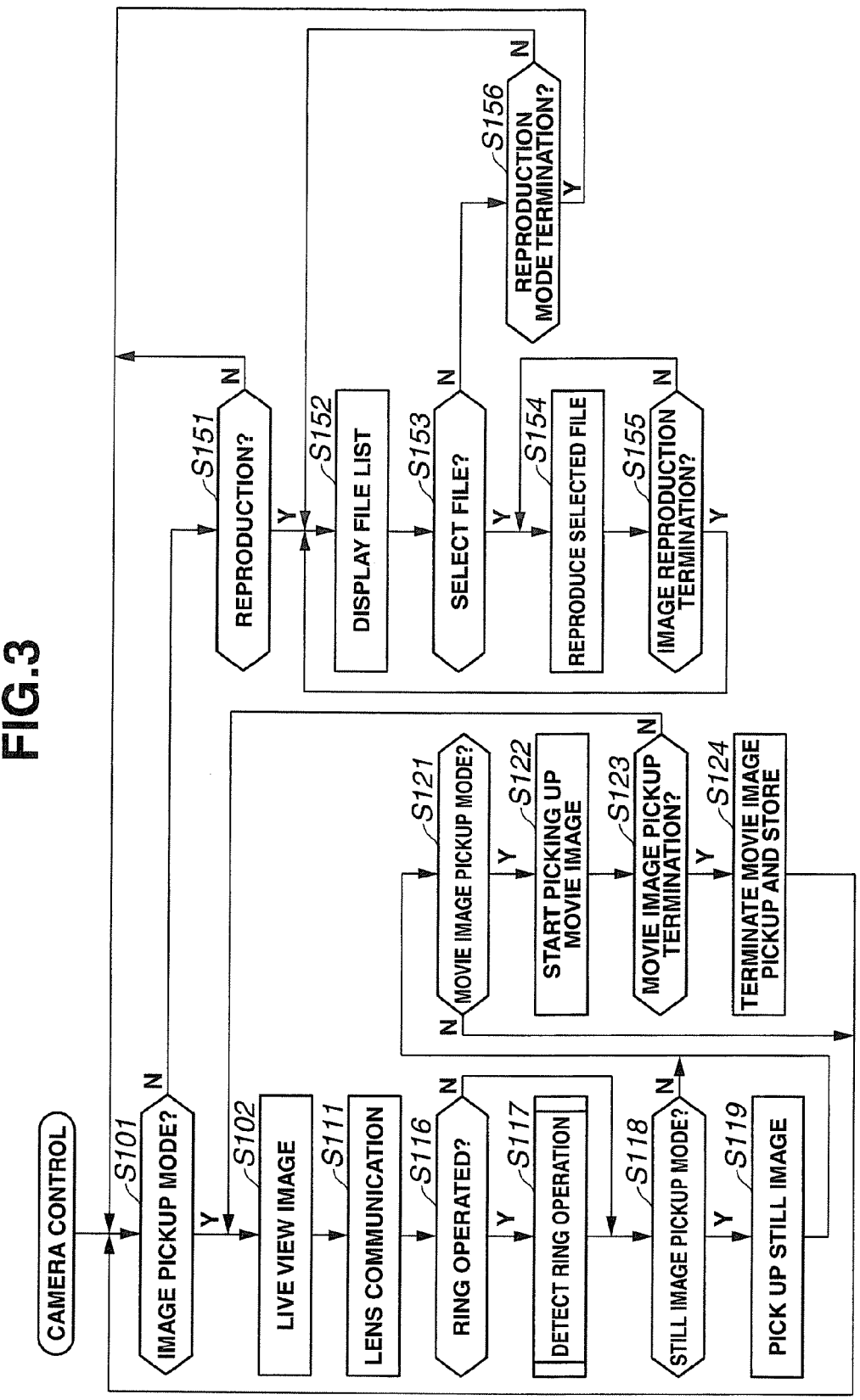
FIG. 3 is a flowchart showing a processing sequence of a camera control in the image pickup apparatus (camera) of FIG. 1.
Figure 4:
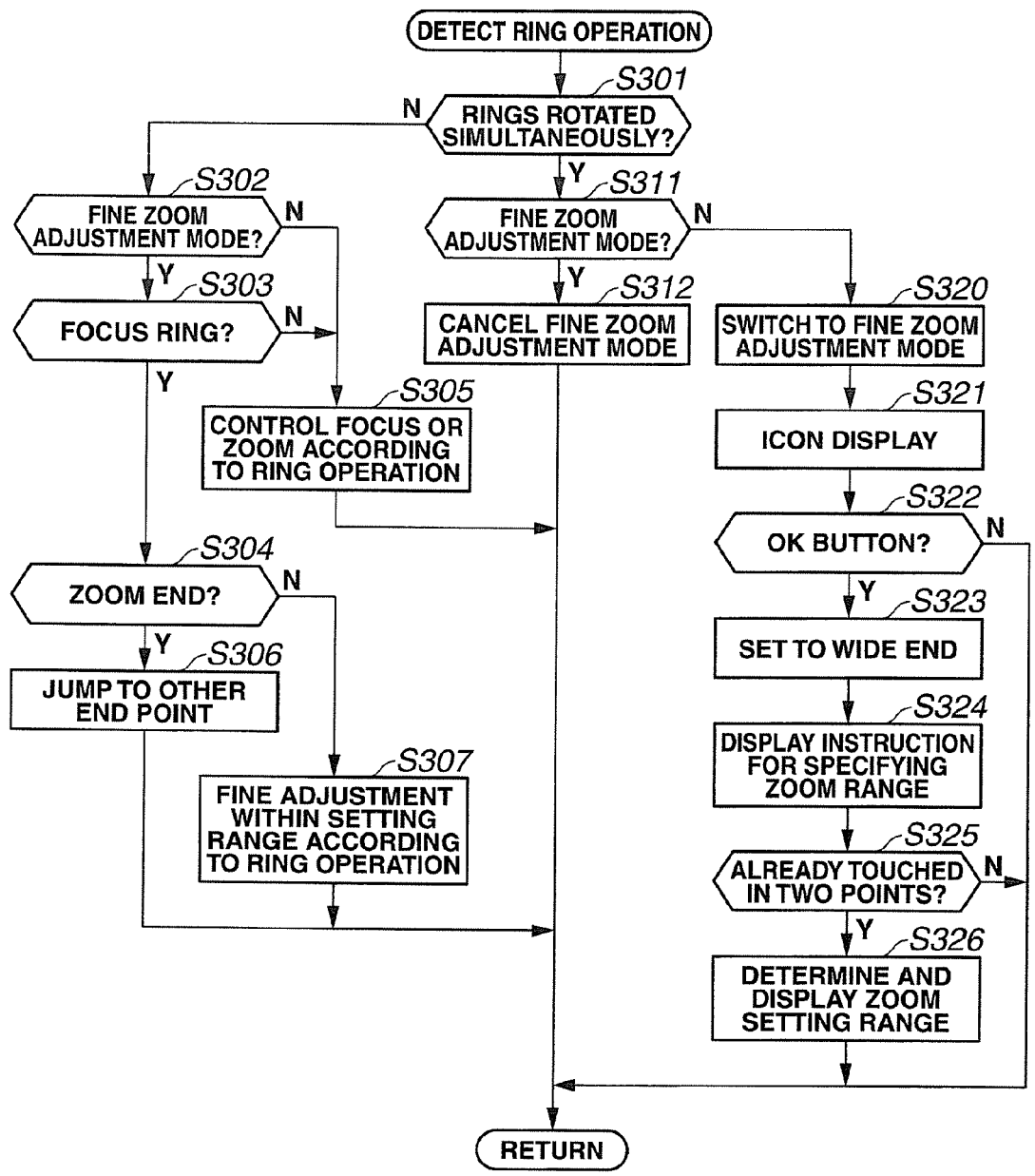
FIG. 4 is a flowchart showing a subroutine (a process in step S117) in the processing sequence of FIG. 3.

FIG. 3 is a flowchart showing a processing sequence of a camera control in the camera of the present embodiment. FIG. 4 is a flowchart showing a subroutine (a process in step S117) in the processing sequence of FIG. 3.

First, it is assumed that the camera 1 of the present embodiment is brought into a power on state to be in an activated state where the camera is active. In this state, in step S101, the signal processing control section 11 checks whether or not an action mode currently set is the image pickup mode. Here, when it is checked that the action mode is set to the image pickup mode, the flow proceeds to next step S102. On the other hand, if it is checked that an action mode other than the image pickup mode is set, the flow proceeds to step S151.

In step S102, the signal processing control section 11 controls the image pickup section that is constituted by the image pickup device 13, the lens 26, and the like, and the display section 18, and the like to perform image data obtaining processing and live view image display processing. The flow thereafter proceeds to step S111.

Next, in step S111, the signal processing control section 11 controls the body-side communication section 12 to perform lens communication processing with the lens control section 21 of the lens barrel 20 via the lens-side communication section 22. The lens communication processing includes obtaining lens information on a type and the like of the lens barrel 20 mounted on the camera body 10.

Note that the lens communication processing also includes checking whether or not the lens barrel 20 is mounted on the camera body 10, or checking whether or not a lens change operation is performed. Here, for example, if communication between the body-side communication section 12 and the lens-side communication section 22 cannot be established, it is determined that the lens barrel 20 is not mounted on the camera body 10, and in this case, the signal processing control section 11 controls the display section 18 via the display control section 11*d* to perform a control for displaying a warning display or the like accordingly, which prompts the user to mount the lens barrel 20. Then, the signal processing control section 11 waits to check that the lens is mounted and performs the lens communication processing. In addition, if the lens communication processing is performed and it is checked that the lens information on the lens barrel 20 currently held by the signal processing control section 11 on the camera body 10 side does not match the lens information obtained from the lens barrel 20 side currently mounted on the camera body 10 as a result of the lens communication processing, it is determined that the lens change operation has been performed, and in this case, the signal processing control section 11 performs processing such as to temporarily store the newly obtained lens information in the temporary storage section 16 or the like. The flow thereafter proceeds to a process of step S116.

In step S116, the signal processing control section 11 communicates with the lens control section 21 via the communication sections 12 and 22, and monitors signals from the first turning detection section 27*a* and the second turning detection section 27*b* to check whether or not the focus ring 23*a* (first operation ring) and the zoom ring 23*b* (second operation ring) are operated. Here, if it is checked that one or both of the two rings 23*a* and 23*b* are operated, the flow proceeds to a process of next step S117. On the other hand, if it is checked that neither of the two rings 23*a* and 23*b* is operated, the flow proceeds to a process of step S118.

In next step S117, the signal processing control section 11 executes a subroutine in the ring operation detection processing (a processing sequence of FIG. 4). The flow thereafter proceeds to a process of step S118. Note that the process of step S117 will be described in detail with reference to FIG. 4.

Next, in step S118, the signal processing control section 11 checks whether or not an action mode on image pickup processing that is currently set is set to a still image pickup mode. Here, if it is checked that the action mode is set to the still image pickup mode, the flow proceeds to a process of next step S119. On the other hand, if an action mode other than the still image pickup mode is set, the flow proceeds to a process of step S121.

In step S119, the signal processing control section 11 executes predetermined still image pickup processing. A sequence of the still image pickup processing is similar to a process that is performed by ordinary conventional cameras. Detailed description thereof will be therefore omitted.

In the abovementioned process of step S118, if it is checked that the action mode other than the still image pickup mode is set and the flow proceeds to the process of step S121, in this step S121, the signal processing control section 11 checks whether or not an action mode about image pickup processing that is currently set is set to a movie image pickup mode. Here, if it is checked that the action mode is set to the movie image pickup mode, the flow proceeds to a process of next step S122. On the other hand, if an action mode other than the movie image pickup mode, that is, the still image pickup mode is set, the flow returns to the abovementioned process of step S101.

In step S122, the signal processing control section 11 starts a sequence of a predetermined movie image pickup processing. This sequence of the movie image pickup processing is also similar to a process that is performed by ordinary conventional cameras. Detailed description thereof will be therefore omitted.

Note that when, if the abovementioned movie image pickup processing of step S122 is started, in next step S123, the signal processing control section 11 monitors an instruction signal from the operation section 15, and continues to check a movie image pickup processing terminate instruction signal all the time during the processing. Here, if the instruction signal that instructs termination of the movie image pickup processing is checked, the flow proceeds to a process of step S124. On the other hand, if the movie image pickup processing terminate instruction signal is not checked, the flow returns to the abovementioned process of step S102, and repeats the subsequent processes.

Then, in step S124, the signal processing control section 11 controls the storage section 14 to execute a process for storing the obtained image data, after executing terminate processing of the movie image pickup processing. The flow thereafter returns to the process of step S101.

On the other hand, in the abovementioned process of step S101, when it is checked that the action mode set to the camera 1 is that other than the image pickup mode and the flow proceeds to a process of step S151, in step S151, the signal processing control section 11 checks whether or not an action mode that is currently set is a reproduction mode. Here, if it is checked that the action mode is set to the reproduction mode, the flow shifts to a predetermined reproduction processing sequence and proceeds to a process of the step S152.

In step S152, the signal processing control section 11 controls the storage section 14 to read out thumbnail image data of the image data that has been stored in the storage medium, and controls the display section 18 via the display control section 11d to execute file list display processing, after subjecting the thumbnail image data to a predetermined signal processing. Note that, instead of the file list display processing, the following display processing may be executed. That is, when it is checked that the camera 1 is in the reproduction mode, the signal processing control section 11 controls the storage section 14 to read out the latest piece of image data out of the pieces of image data that have been stored in the storage medium, controls the display section 18 via the display control section 11d to execute reproduction processing to a latest image, after subjecting the latest piece of image data to a predetermined signal processing. The flow thereafter proceeds to a process of step S153.

Next, in step S153, the signal processing control section 11 monitors an instruction signal from the operation section 15 or the touch panel 18b to check whether or not a file selection instruction signal is generated. Here, the file selection instruction signal is an instruction signal to select any one of the files in the displayed file list. Note that, in the case of displaying the latest image, the file selection instruction signal is an instruction signal that instructs selection of a piece of image data before the displayed piece of image data or the oldest piece of image data out of the pieces of stored image data. In the process of step S153, if the signal processing control section 11 checks the generation of the file selection instruction signal, the flow proceeds to a process of step S154. On the other hand, if the file selection instruction signal is not checked, the flow proceeds to a process of step S156.

Next, in step S154, the signal processing control section 11 controls the storage section 14 to read out the piece of image data that is selected in the abovementioned process of step S153 out of the pieces of image data that have been stored in the storage medium, and controls the display section 18 via the display control section 11d to execute reproduction processing to the selected image, after subjecting the selected piece of image data to predetermined signal processing. The flow thereafter proceeds to a process of step S155.

In step S155, the signal processing control section 11 monitors the instruction signal from the operation section 15 or the touch panel 18b to check whether or not an instruction signal to terminate displaying the selected image is generated. In this step S155, if the selected image display terminate instruction signal is not checked, the flow returns to the abovementioned process of step S154. That is, the signal processing control section 11 continues to execute the display processing of the same selected image. On the other hand, if the selected image display terminate instruction signal is checked, the flow returns to the process of step S152 and repeats the subsequent processes.

On the one hand, if the file selection instruction signal is not checked in the abovementioned process of step S153 and the flow proceeds to the process of step S156, in this step S156, the signal processing control section 11 monitors the instruction signal from the operation section 15 or the touch panel 18b to check whether or not a terminate instruction signal for the reproduction mode is generated. Here, the reproduction mode terminate instruction signal is, for example, a mode switch operation or a power off operation. In this step S156, if the reproduction mode terminate instruction signal is not checked, the flow returns to the abovementioned process of step S152 and repeats the subsequent processes. On the other hand, if the reproduction mode terminate instruction signal is checked, the flow returns to the process of step S101 and repeats the subsequent processes. Note that, if the power off operation is performed as a trigger of generating the reproduction mode terminate instruction signal, the control processing sequence of the camera is terminated to terminate all the operations. For the processing sequence, illustration is omitted in FIG. 3, in order not to make the drawing complicated.

Alternately, if it is checked that an action mode other than the reproduction mode is set in the abovementioned process of step S151, a processing sequence to shift the action mode to the other action mode is executed. Here, for example, the other action modes include an image communication mode, but detailed descriptions of the other action modes will be omitted because the other action modes do not directly relate to the present invention, and the flow returns to the abovementioned process of step S101 as a matter of convenience, as a processing sequence of the case where the action mode other than the reproduction mode is set.

A series of above reproduction processing sequences in the camera 1 of the present embodiment is similar to that of ordinary conventional form of cameras.

Note that the signal processing control section 11 of the camera 1 of the present embodiment always monitors the instruction signal from the operation section 15, the touch panel 18b, or the like. Then, the signal processing control section 11 is configured to, at any point in time in the processing sequences when the instruction signal from the operation section 15, the touch panel 18b, or the like is checked, cause a process corresponding to the checked instruction signal to interrupt. As a result, regardless of the operation state of the camera 1, if a predetermined interrupt signal (e.g., a power off signal, a reset signal, and an action switch signal) is checked, the signal processing control section 11 interrupts a running process, or waits for a running process to terminate, and executes a process corresponding to an interrupt instruction (e.g., power off processing, reset processing, and action switch processing).

Next, the subroutine of the ring operation detection processing (the process of step S117 of FIG. 3) in the fine zoom adjustment mode of the camera of the present embodiment will be described below in detail with reference to FIG. 4.

As described above, in the abovementioned process of step S116 of FIG. 3, when one or both of the above two operation rings 23a and 23b are operated, the flow shifts to a process of step S117, that is, a processing sequence of FIG. 4.

First, in step S301 of FIG. 4, the signal processing control section 11 checks whether or not a simultaneous turning operation of the above two operation rings 23a and 23b is performed, based on a detection result from the abovementioned process of step S116. Here, if it is checked that the simultaneous turning operation of the above two operation rings 23a and 23b is performed, the signal processing control section 11 prohibits a control corresponding to the turning operations of the respective operation rings 23a and 23b, and causes the flow to proceed to a process of next step S311. Here, the reason why the control corresponding to the turning operations of the respective operation rings are prohibited when the simultaneous turning operation of the above two operation rings 23a and 23b are detected is as follows. That is, if the simultaneous turning operation of the two operation rings 23a and 23b are detected, it cannot be determined whether the operations are intentional or due to an operational error. For this reason, the control corresponding to the simultaneous turning operation is prohibited in a stage of the process step, in order to prevent a focus setting or a zoom setting that is currently set from being unintentionally deviated even if the simultaneous turning operation is due to the operational error.

On the other hand, here, if it is checked that the simultaneous turning operation of the operation rings is not performed, for example, if an operation of only one of the two operation rings 23a and 23b is checked, the flow proceeds to a process of step S302.

In step S311, the signal processing control section 11 checks whether or not the fine zoom adjustment mode is currently set. Here, if the fine zoom adjustment mode is already currently set, the flow proceeds to a process of step S312.

Next, in step S312, the signal processing control section 11 cancels the fine zoom adjustment mode that is currently set, and switches the setting to a normal zoom control mode. The flow thereafter returns the original processing sequence (FIG. 3), and proceeds to a process of step S118 of FIG. 3. Note that, in the above process of step S312, the signal processing control section 11 may be configured to, before the cancellation processing of the fine zoom adjustment mode, display a warning the cancellation processing (to cancel the fine zoom adjustment mode and switch to the normal zoom control mode) on the display section 18 to ask the user to accept or reject the cancellation processing.

On the other hand, in the abovementioned process of step S311, if the fine zoom adjustment mode is not currently set but the normal zoom control mode is set, the flow proceeds to a process of step S320.

In step S320, the signal processing control section 11 starts executing fine zoom adjustment mode switch processing in which the zoom control is switched to the fine zoom adjustment mode.

Next, in step S321, the signal processing control section 11 controls the display section 18 via the display control section 11d to execute predetermined icon display processing to the display screen of the display section 18. As icon data to be displayed here, for example, data that has been stored in the storage section 14 or the like in advance is used.

Figure 5:
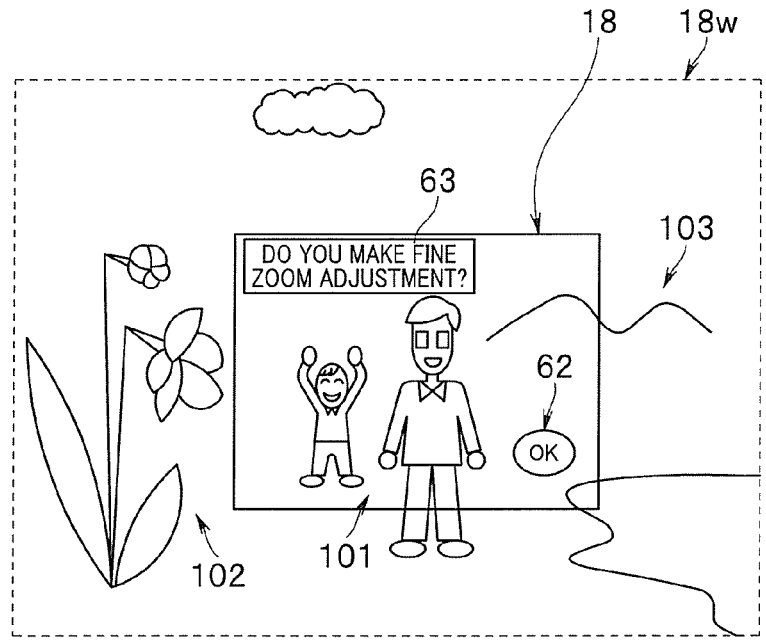
FIG. 5 is a schematic diagram showing an image pickup range when the situation shown in FIG. 2 is set as an image pickup target by the image pickup apparatus (camera) of FIG. 1.

Here, the display screen of the live view image in the fine zoom adjustment mode and concepts in an operation thereof will be described. FIG. 5 is a schematic diagram showing an image pickup range when the camera 1 of the present embodiment sets an image pickup target to the situation illustrated in abovementioned FIG. 2. In FIG. 5, a rectangular frame that is shown by a dotted line and denoted by reference character 18w is an image pickup frame showing an image pickup range obtained when the image pickup optical system of the lens barrel 20 of the camera 1 of the present embodiment is set to a shortest focus end (widest-angle end). In addition, in FIG. 5, a rectangular frame that is shown by a solid line and denoted by reference numeral 18 is a display range (image pickup range; image pickup frame) of the live view image that is displayed on the display screen of the display section 18. That is, in FIG. 5, the live view image displayed on the display section 18 shows a state where a zooming is performed from the widest-angle end by a predetermined amount, within a zoom range that can be set by the lens barrel 20 of the camera 1.

In use of the camera 1, if the process step S320 of FIG. 4 (fine zoom adjustment mode switch processing) is executed when the image pickup optical system is in a state of being set at any zoom position, the display screen of the display section 18 is brought into a state shown by the rectangular frame denoted by reference numeral 18 shown by the solid line of FIG. 5, and into a state of waiting for the user to perform an operation input. At this point, on the display screen of the display section 18, an explanatory display 63 such as "Do you make fine zoom adjustment?" and an "OK" icon 62 and the like are displayed in a predetermined region of the display screen in such a manner as to be superimposed on the live view image of the image pickup target (a process of step S321 of FIG. 4; to be described hereafter).

During the display on the display screen, the user accepts the switch to the fine zoom adjustment mode by, for example, performing a touch operation to the above "OK" icon 62 via the touch panel 18b, or operating an OK button (not shown) or the like included the operation section 15 on the camera body 10 side. The zoom control mode of the camera 1 is thereby switched to the fine zoom adjustment mode. In addition, if the user does not accept the switch to the fine zoom adjustment mode, the user can cancel the processing by performing an operation for this purpose during the display on the display screen, for example, by performing a predetermined operation to a region other than the above "OK" icon 62 via the touch panel 18b, or operating a predetermined operation member or the like included in the operation section 15 on the camera body 10 side.

That is, in step S322 of FIG. 4, the signal processing control section 11 monitors the instruction signal from the touch panel 18b or the operation section 15 to check whether or not an "OK" instruction is generated. Here, if the "OK" instruction is checked, the flow proceeds to a process of next step S323 considering that the user accepts the switch processing to the fine zoom adjustment mode. On the other hand, if the "OK" instruction is not checked, the signal processing control section 11 executes predetermined cancellation processing to leave the processing sequence of FIG. 4, returns to the original processing sequence (FIG. 3), and proceeds to a process of step S118 of FIG. 3, considering that the user does not accept the switch processing to the fine zoom adjustment mode.

In such a manner, when the user accepts the switch processing to the fine zoom adjustment mode, in step S323, the signal processing control section 11 next communicates with the lens control section 21 of the lens barrel 20 via the communication sections 12 and 22. Then, the signal processing control section 11 controls the zoom drive section 24a via the lens control section 21 to perform the zoom drive control to zoom optical system by the zoom drive mechanism section 26a, and sets the zoom setting to the widest-angle end (wide end) (refer to FIG. 6).

Next, in step S324, the signal processing control section 11 controls the display section 18 via the display control section 11d to perform an instruction display for setting a zoom range on the display screen of the display section 18, that is, to execute icon display processing for the fine zoom adjustment mode. As icon data to be displayed here, for example, data that has been stored in the storage section 14 in advance is used. Here, the signal processing control section 11 is brought into a state of waiting for the user to perform an operation input. Here, the user specifies a desired zoom range in the fine zoom adjustment mode by performing a touch operation to specify two points on the touch panel 18b.

Figure 6:
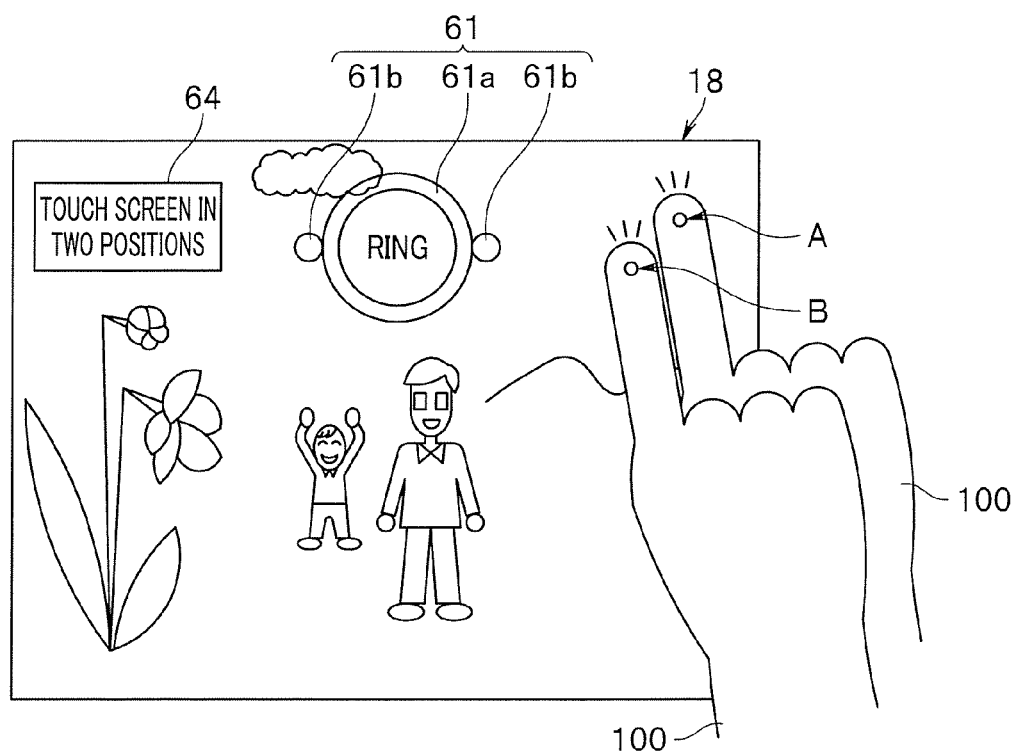
FIG. 6 is a diagram of one example of a live view image display when the image pickup apparatus (camera) of FIG. 1 operates in a fine zoom adjustment mode, showing a live view image during an operation in the fine zoom adjustment mode and shows how to perform a setting operation to a desired zoom range for fine zoom adjustment under the situation.
Figure 7:
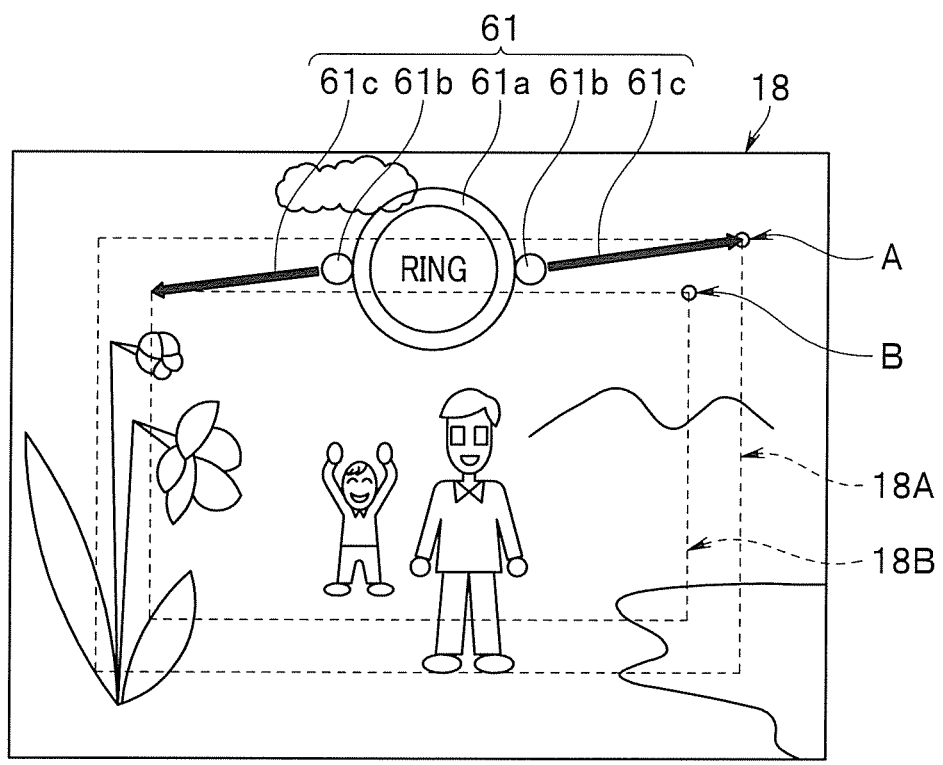
FIG. 7 is a diagram of a display example of the live view image after a change resulted from the setting operation of FIG. 6.

Here, FIG. 6 and FIG. 7 show one example of the live view image display where the camera 1 of the present embodiment operates in the fine zoom adjustment mode. Among these drawings, FIG. 6 shows the live view image during an operation in the fine zoom adjustment mode, and shows how to perform a setting operation to a desired zoom range for fine zoom adjustment under the condition. In addition, FIG. 7 shows a display example of the live view image after the change as a result of the setting operation of FIG. 6.

As described above, when a mode switch operation to the fine zoom adjustment mode is performed under the condition of FIG. 5, the live view image of the display section 18 is changed to a display shown in FIG. 6. That is, the zoom drive control is performed in the process of step S323 of abovementioned FIG. 4 and the zoom setting is set to the widest-angle end (wide end). Next, in step S324, a predetermined icon display processing to specify the zoom range is performed. In this case, a fine zoom adjustment icon 61, an explanatory display 64 such as "touch the screen in two positions", and the like are displayed in a predetermined region in the display screen, in such a manner as to be superimposed on the live view image of the image pickup target (refer to FIG. 7). Here, the fine zoom adjustment icon 61 is configured by, as shown in FIG. 7, an annular portion 61a that is imitative of an annular-shaped operation member, and a plurality of (two in the present example) indicators 61b at positions along a periphery of the annular portion 61a.

During the display of the display screen of FIG. 6, the user performs touch operation to any two points on the display screen of the display section 18, with a finger or the like via the touch panel 18b. For example, the example illustrated in FIG. 6 shows a situation where the user performs the touch operation to two points of a point A and a point B with a finger 100. The touch operation performed here is an operation to set a zoom range for the fine zoom adjustment. That is, the zoom setting currently set is at the widest-angle end (wide end) as described above, with which an image pickup range of the widest angle that can be set by the image pickup optical system of the camera 1 is shown. The user sets the desired zoom range within the image pickup range by specifying any two points through the touch operation. In the example shown here, one of the two points specified through the touch operation is set as one corner of an image pickup range defined by an angle of view specified at one of the ends (short focus (wide angle) side) within the desired zoom range, and the other point is set as one corner of an image pickup range defined by an angle of view specified at the other end (long focus (telephoto) side) within the desired zoom range. Thereby, with respect to the one specified point A through the touch operation, the image pickup range at the one end (short focus (wide angle) side) denoted by reference character 18A is set out of two rectangular frames shown by dotted lines in FIG. 7, and with respect to the other specified point B, the image pickup range at the other end (long focus (telephoto) side) denoted by reference character 18B is set out of the two rectangular frames shown by the dotted lines in FIG. 7.

In such a manner, the two-point touch operation performed by the user through the touch operation sets the zoom range for the fine zoom adjustment.

Then, in step S325 in FIG. 4, the signal processing control section 11 monitors an output of an instruction signal from the touch determination section 11c, to check whether or not the two-point touch operation is performed. Here, if the two-point touch operation is checked, the flow proceeds to a process of next step S326. On the other hand, if the two-point touch operation is not checked within a predetermined period of time that has been set in advance, or if a cancellation instruction is checked, the signal processing control section 11 executes a predetermined cancellation processing to leave the processing sequence of FIG. 4, and the flow returns to the original processing sequence (FIG. 3) and proceeds to a process of step S118 in FIG. 3. Note that the above predetermined period of time is counted by referring the clock section 19. In addition, the cancellation instruction may be an instruction signal generated by a predetermined operation, such as a double-tap operation to a single point, or an interrupt instruction signal or the like from the other operation member such as the operation section 15.

Next, in step S326, the signal processing control section 11 determines a zoom setting range for the fine zoom adjustment based on a result of the setting operation through the above two-point touch operation, controls the display section 18 via the display control section 11d to execute the display processing for this purpose. An example of the display result at this time is shown in FIG. 7. In the example shown in FIG. 7, the two image pickup ranges representing the zoom range for the fine zoom adjustment are displayed with the two rectangular frames 18A and 18B. In addition thereto, arrow icons 61c extended from the two indicators 61b of the fine zoom adjustment icon 61 are displayed. In this case, the display is made such that one of the arrow icons 61c points to the rectangular frame 18A, and the other arrow icon 61c points to the rectangular frame 18B.

Note that, the signal processing control section 11 may control, when the zoom setting range for the fine zoom adjustment is determined in the abovementioned manner, the zoom drive section 24a via the lens control section 21 to perform a zoom drive control to the zoom optical system by the zoom drive mechanism section 26a, and to perform a zoom setting to one of the ends within the set zoom range, for example, the short focus (wide angle) side. In this case, one of the image pickup ranges is displayed on the entire display screen of the display section 18, and the other image pickup range is displayed by the dotted-line rectangular frame 18B. The image pickup parameter used here is zooming, and an effect thereof corresponds to a position (touched point) on the above display section. Since the display control section displays a direction or a rotation position of the above rotational operation, the user can perform the operation while quickly and intuitively understanding the zooming operation.

During the display of the display screen in this FIG. 7, the user can perform the fine adjustment of zooming by turning the focus ring 23a within the set zoom range (a process of step S303 of FIG. 4 to be described hereafter). In this case, the focus ring 23a functions as, unlike in the normal action mode, an operation member for driving the zoom drive mechanism section 26a via the zoom drive section 24a.

Note that an operation method for the fine zoom adjustment may be, apart from the above operation of the focus ring 23a, a touch and slide operation along the annular portion 61a of the fine zoom adjustment icon 61, on the display screen of FIG. 7 through the touch panel 18b.

Furthermore, apart from these operations, a form may be employed in which a dial-like member having a form similar to the annular portion 61a of the fine zoom adjustment icon 61 is provided on the camera body 10, and a control of similar fine zoom adjustment is performed by performing a turning operation to the dial-like member.

On the other hand, if it is checked that the simultaneous turning operation is not performed in the abovementioned process of step S301 and the flow proceeds to a process of step S302, in this step S302, the signal processing control section 11 checks whether or not fine zoom adjustment mode is currently set. Here, if the fine zoom adjustment mode is already currently set, the flow proceeds to a process of step S303. On the other hand, if it is checked that the fine zoom adjustment mode is not currently set and the normal zoom control mode to perform a normal zoom control is set, the flow proceeds to a process of step S305.

In step S303, the signal processing control section 11 checks whether or not the turning operation is performed to the focus ring 23a of the two operation rings 23a and 23b, based on the detection result from the abovementioned process of step S116 of FIG. 3. Here, if the turning operation of the focus ring 23a is checked, the signal processing control section 11 determines that the zooming operation for the fine zoom adjustment is performed, and the flow proceeds to a process of next step S304. On the other hand, if the turning operation to a focus ring other than focus ring 23a, that is, to the zoom ring 23b is checked, the flow proceeds to a process of step S305.

In step S305, the signal processing control section 11 performs a normal focus control or zoom control in accordance with the performed ring operation. Note that, since the normal focus control and zoom control are similar to controls of ordinary conventional cameras, detailed descriptions thereof will be omitted.

The abovementioned process of step S305 will be described in detail. As described above, the flow enters the process of step S305 if the fine zoom adjustment mode is not set (the normal zoom control mode is set) in the above process of the step S302, or if it is checked that the fine zoom adjustment mode is set in the process of step S302 and the operation of the zoom ring 23b is checked in the process of step S303.

Therefore, in the former case, that is, in the normal zoom control mode, a control based on a normal operation of the operation ring is performed. On the other hand, in the latter case, that is, if an operation of the zoom ring 23b is performed when the fine zoom adjustment mode is set, it is determined that the user intends not to perform the fine zoom adjustment but intends to, for example, set a zoom range for the fine zoom adjustment again, and a control based on the normal operation of the operation ring is performed. The flow thereafter returns to the original processing sequence (FIG. 3), and proceeds to a process of step S118 of FIG. 3.

On the other hand, when the fine zoom adjustment operation by a turning operation of the focus ring 23a is checked in the abovementioned process of step S303 and the flow proceeds to a process of step S304, in this step S304, the signal processing control section 11 checks whether or not the zoom position is set at one of the zoom ends within the zoom setting range as a result of the fine zoom adjustment operation of the focus ring 23a through the abovementioned process of step S303. Here, if it is checked that the zoom position reaches the zoom end within the zoom setting range, the flow proceeds to a process of next step S306. On the other hand, if it is checked that the zoom position does not reach the zoom end within the zoom setting range, the flow proceeds to a process of step S307.

In step S306, the signal processing control section 11 changes the zoom setting to a zoom end different from the zoom end within the zoom setting range. With this processing, the zooming operation can be seamlessly and continuously performed within the zoom setting range even if the user continues the turning operation of the focus ring 23a only in one direction. The flow thereafter returns to the original processing sequence (FIG. 3), and proceeds to a process of step S118 of FIG. 3.

Alternately, in step S307, the signal processing control section 11 performs a fine zoom adjustment control within the zoom setting range in accordance with the turning operation of the focus ring 23a. The flow thereafter returns to the original processing sequence (FIG. 3), and proceeds to a process of step S118 of FIG. 3.

Note that, in the present embodiment, although the simultaneous turning operation of the two operation rings 23a and 23b that are constituted by the annular shape operation members is considered as a trigger for switching to the fine zoom adjustment mode, but the present embodiment is not limited to the form. For example, a form may be employed in which a simultaneous operation of a plurality of operation members such as a press button and a slide operation member included in the operation section 15 provided on the camera body 10 side is a trigger for switching between the modes.

As described above, according to the first embodiment, when the simultaneous operation of the two operation rings 23a and 23b that are provided adjacent to each other due to downsizing is performed, a switch to an novel action mode (more specifically, the fine zoom adjustment mode among the zoom controls) is seamlessly performed. In this case, the camera is controlled so as to prohibit the normal control of the respective operation rings 23a and 23b when the simultaneous operation of the two operation rings 23a and 23b is detected. In such a manner, since the normal control allocated to the respective operation rings 23a and 23b is prohibited when the two operation rings 23a and 23b are simultaneously operated, an accident such as a setting deviation can be prevented even if the simultaneous operation of the two operation rings 23a and 23b is due to an operational error, and at the same time, the zoom control can be seamlessly shifted to the fine zoom adjustment mode.

Then, a control is performed so as to, after switching to the fine zoom adjustment mode, set the desired zoom range on the display screen of the display section 18, and to allow the user to perform the fine zoom adjustment operation through the turning operation of the focus ring 23a adjacent to the zoom ring 23b for performing the zooming operation.

Therefore, in the zoom control in the fine zoom adjustment mode, the user can perform a minute zoom control within the desired image pickup range to easily perform a strict framing. Thereby, since a desired setting of the image pickup range (framing) can be more easily performed as compared to the normal power zoom control, which allows for widening image expression and obtaining a wide range of picked-up images.

[Second Embodiment]

A second embodiment of the present invention to be next described illustrates an example in which a display pattern in the fine zoom adjustment mode is different from that of the abovementioned first embodiment. A basic configuration of an image pickup apparatus (camera) itself of the present embodiment is substantially similar to that of the abovementioned first embodiment, and only a camera control sequence slightly differs from that of the abovementioned first embodiment. Therefore, with respect to components similar to those of the abovementioned first embodiment, illustration will be omitted and description will be made with the same reference characters. In addition, with respect to a similar processing sequence, illustration and description thereof will be omitted, and only different parts thereof will be described below.

Figure 8:
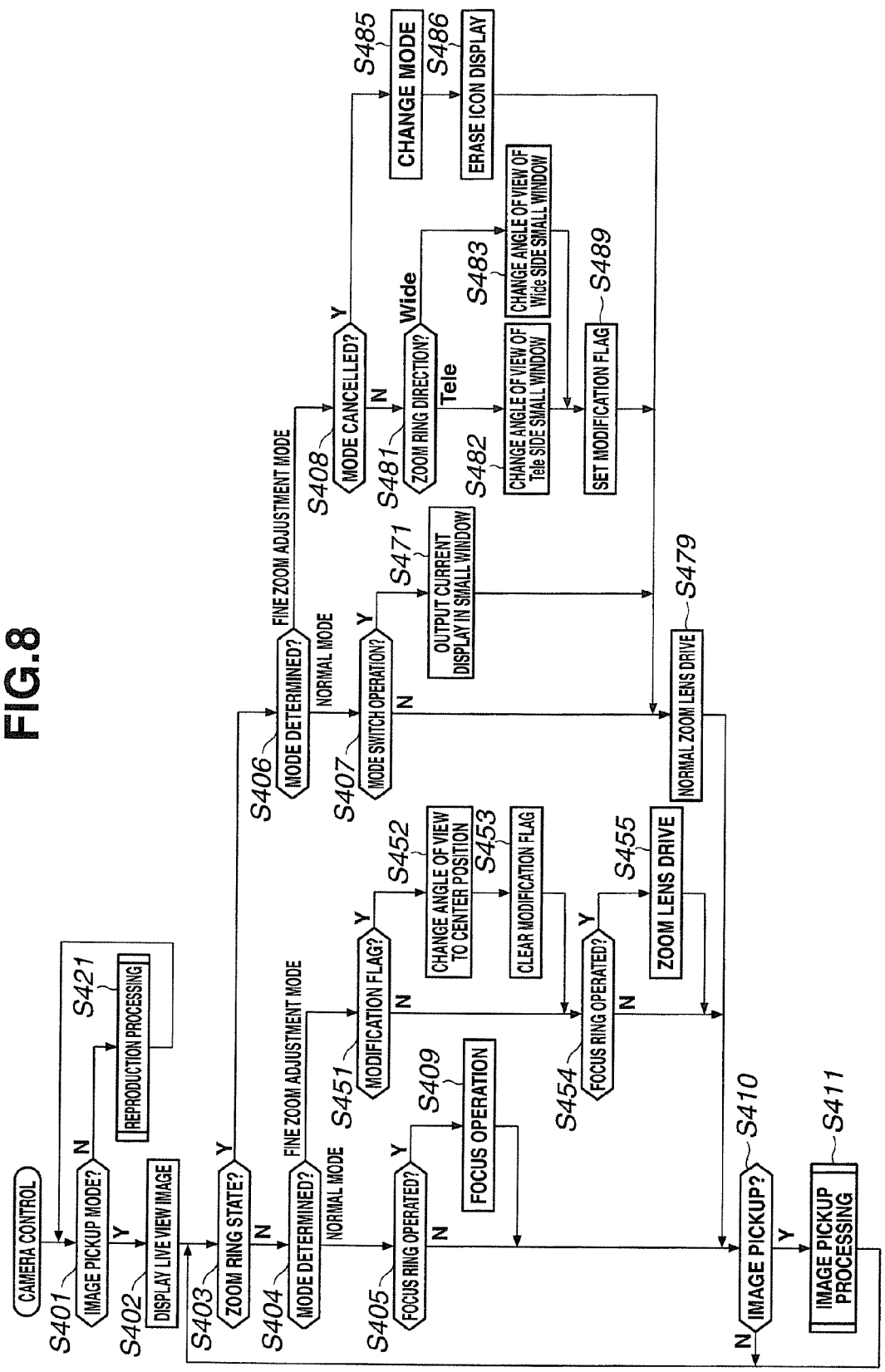
FIG. 8 is a flowchart showing a camera control processing sequence in an image pickup apparatus (camera) of a second embodiment of the present invention.
Figure 9:
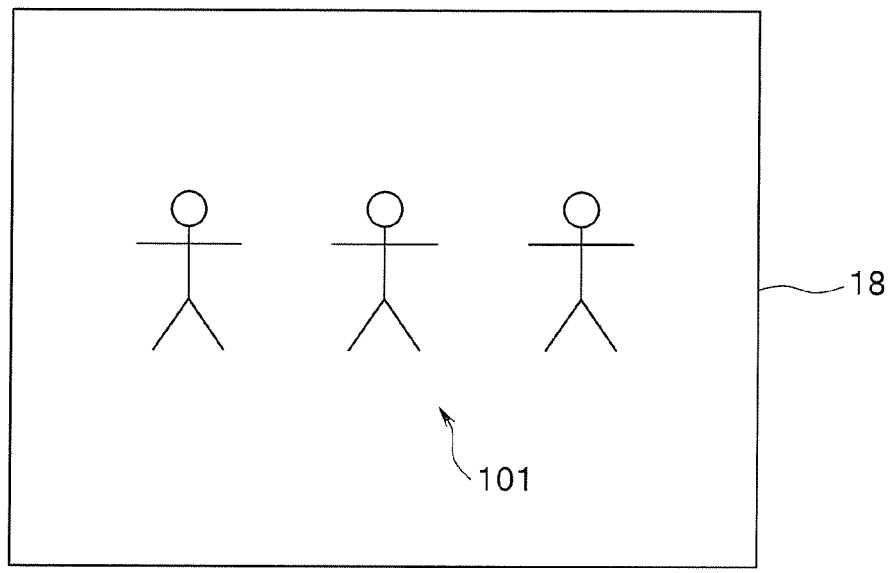
FIG. 9 is a display example of the display section in an image pickup action in the image pickup apparatus (camera) of the second embodiment of the present invention, showing one example of the live view image that is displayed on the display section of the image pickup apparatus (camera)
Figure 10:
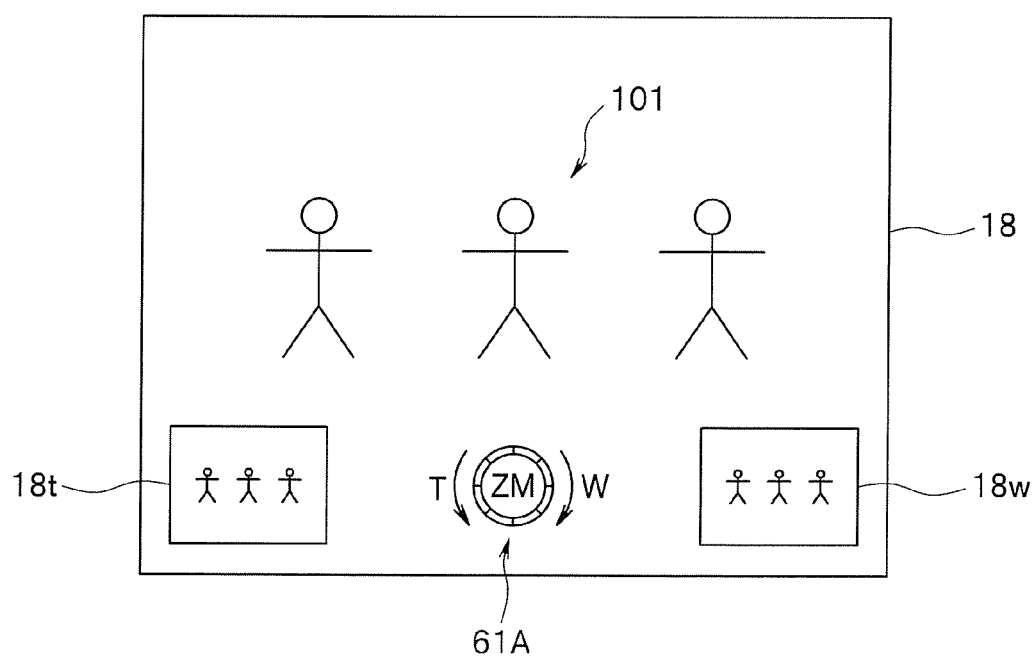
FIG. 10 is a diagram of one example of live view image during the fine zoom adjustment mode in the image pickup apparatus (camera) of the second embodiment of the present invention, and showing a display example of the display section immediately after a switch to the fine zoom adjustment mode.
Figure 11:
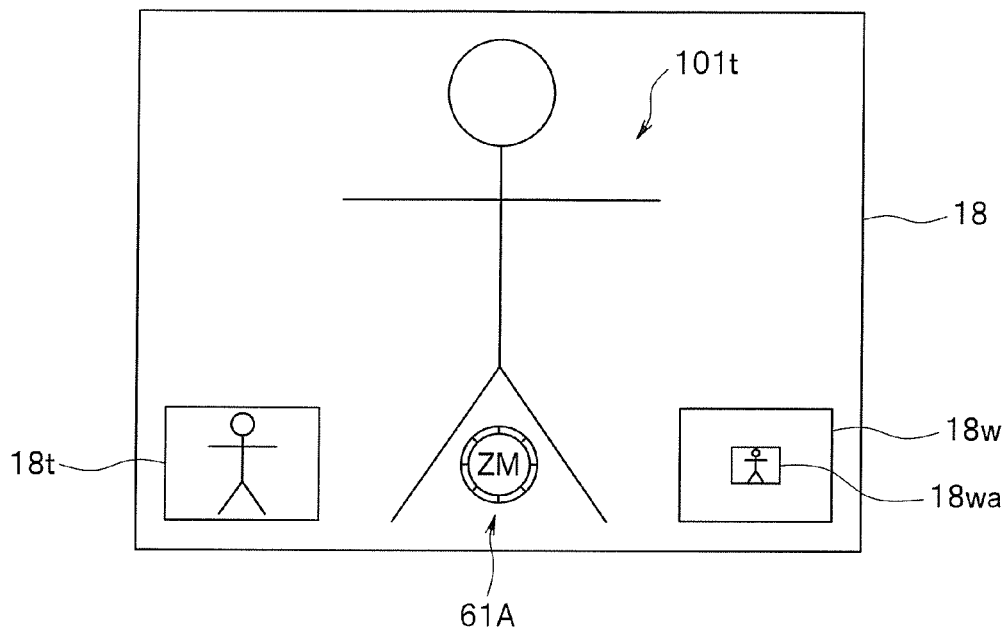
FIG. 11 is a diagram showing a state during the setting operation in the fine zoom adjustment mode in the image pickup apparatus (camera) of the second embodiment of the present invention, and showing a display example of the display section when a zooming operation toward a telephoto side (long-focus side; tele side) is performed from the state of FIG. 10.
Figure 12:
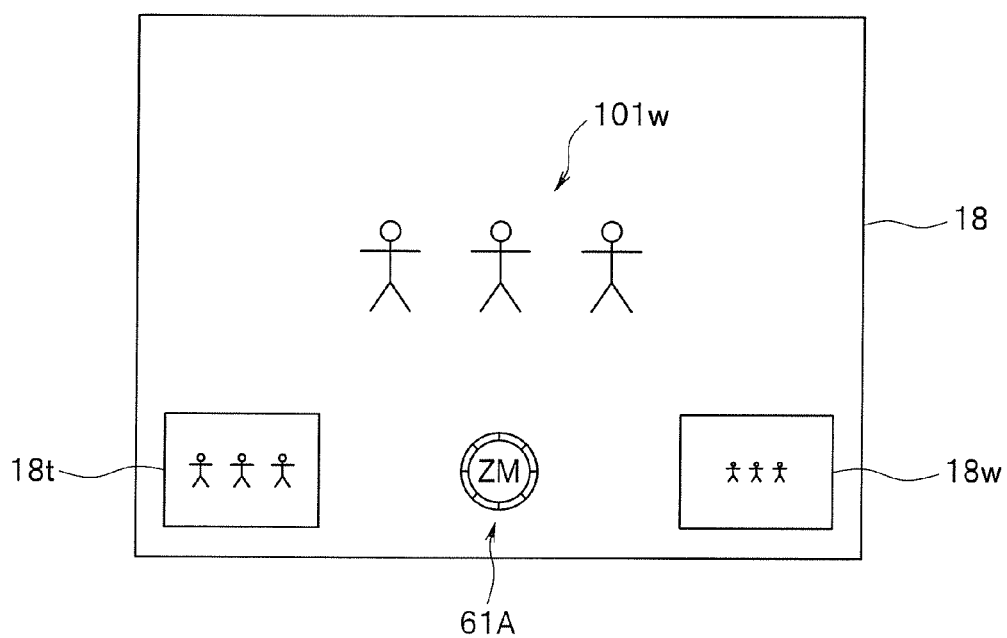
FIG. 12 is a diagram showing a state during the setting operation in the fine zoom adjustment mode in the image pickup apparatus (camera) of the second embodiment of the present invention, and showing a display example of the display section when a zooming operation toward a wide-angle side (short-focus side; wide side) from the state of FIG. 10.
Figure 13:
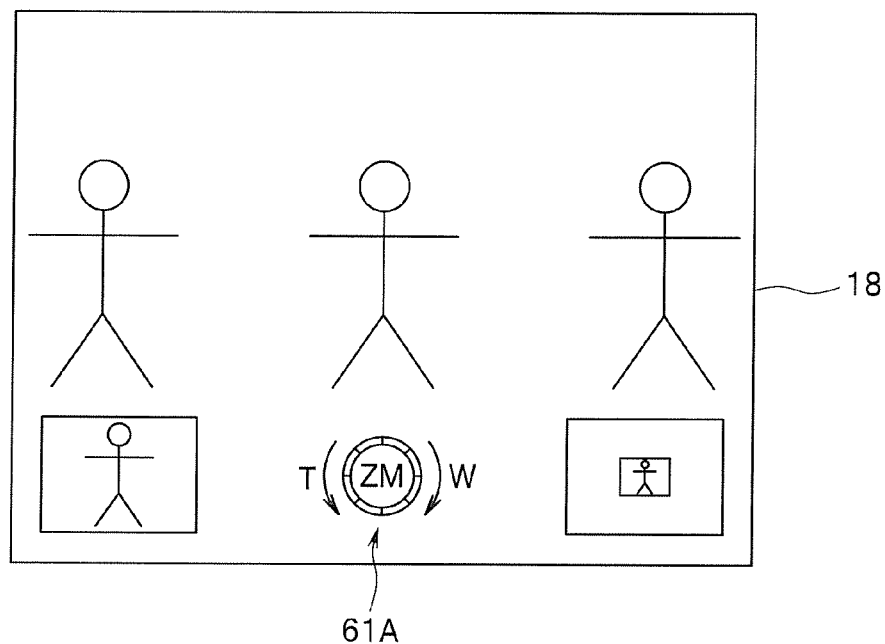
FIG. 13 is a diagram showing an example of a display state of a display section 18 after a zoom drive control is performed in the fine zoom adjustment mode in the image pickup apparatus (camera) of the second embodiment of the present invention, and showing an example of a display screen after a state of FIG. 11, that is, the display screen at the time when the state of FIG. 11 is set in which one of the zoom ends is set at the zoom position of FIG. 10 and the other zoom end is turned in a telephoto direction, and the zoom position is set at a substantial center of the zoom range.
Figure 14:
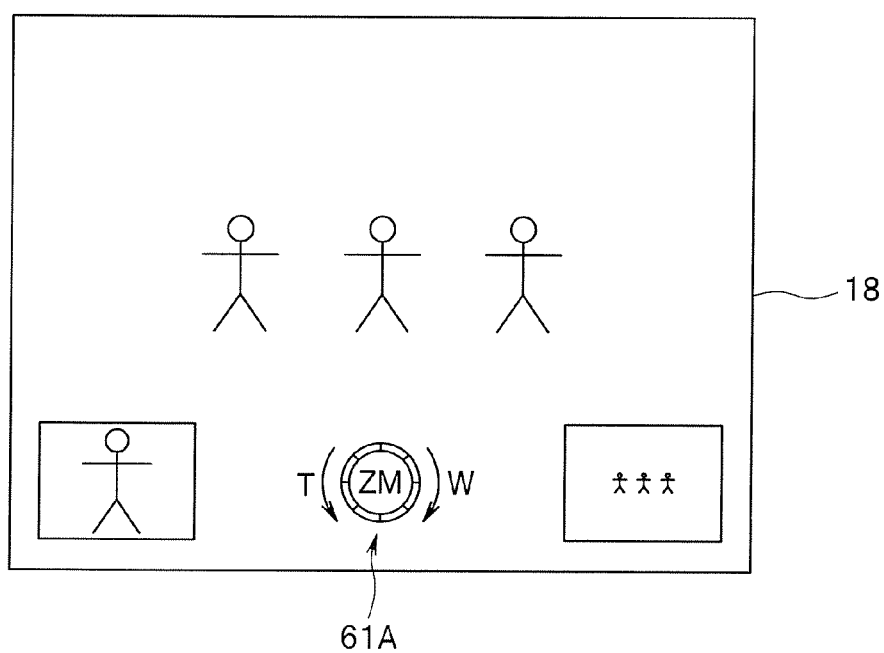
FIG. 14 is a diagram showing an example of a display state of a display section 18 after a zoom drive control is performed in the fine zoom adjustment mode in the image pickup apparatus (camera) of the second embodiment of the present invention, and showing an example of the display screen after a state of FIG. 12, that is, the display screen at the time when the state of FIG. 12 is set in which one of the zoom ends is set at the zoom position of FIG. 10 and the other zoom end is turned in a wide direction, and the zoom position is set at a substantial center of the zoom range.

FIG. 8 is a flowchart showing a camera control processing sequence in the image pickup apparatus (camera) of the second embodiment of the present invention. In addition, FIG. 9 to FIG. 14 are display examples of the display section in an image pickup action in the image pickup apparatus (camera) of the present embodiment. Among these drawings, FIG. 9 shows one example of a live view image displayed on the display section of the image pickup apparatus (camera). FIG. 10 to FIG. 14 each show one example of a live view image in the fine zoom adjustment mode in the image pickup apparatus (camera). Among these drawings, FIG. 10 is a display example of the display section immediately after a switch to the fine zoom adjustment mode. FIG. 11 and FIG. 12 show a state in a setting operation in the fine zoom adjustment mode. FIG. 11 is a display example of the display section in the case where a zooming operation is performed from a state of FIG. 10 to a telephoto side (long-focus side; tele side). FIG. 12 is a display example of the display section in the case where a zooming operation is performed from the state of FIG. 10 to a wide-angle side (short-focus side; wide side). FIG. 13 and FIG. 14 each show an example of the display state of the display section 18 after a zoom drive control in the fine zoom adjustment mode. FIG. 13 is an example of the display screen after a state of FIG. 11, that is, the display screen at the time when the state of FIG. 11 is set in which one of the zoom ends is set at the zoom position of FIG. 10 and the other zoom end is turned in a telephoto direction, and the zoom position is set at a substantial center of the zoom range. FIG. 14 is an example of the display screen after a state of FIG. 12, that is, the display screen at the time when the state of FIG. 12 is set in which one of the zoom ends is set at the zoom position of FIG. 10 and the other zoom end is turned in a wide direction, and the zoom position is set at a substantial center of the zoom range.

In the present embodiment, it is assumed that objects 101 such as a plurality of persons are present within a range as the image pickup target, as shown in the live view image of FIG. 9. With respect to an action to be described below, it is assumed that an image is picked up using the camera 1 of the present embodiment in this situation.

First, in step S401 of FIG. 8, the signal processing control section 11 checks whether or not the current action mode is set to the image pickup mode. Here, if it is checked that the image pickup mode is set, the flow proceeds to a process of next step S402. On the other hand, if it is checked that an action mode other than the image pickup mode is set, the flow proceeds to a process of step S421 (corresponding to step S101 of FIG. 3).

In step S402, the signal processing control section 11 controls the image pickup section (the image pickup device 13, the lens 26, and the like) and the display section 18 and the like, to execute obtaining processing of image data and live view image display processing. The flow thereafter proceeds to a process of step S403 (corresponding to step S102 of FIG. 3). Note that, in the present embodiment, illustration of the lens communication processing in the abovementioned embodiment (the process of step S111 of FIG. 3) is omitted. This is because the lens communication processing is a processing step that does not directly relate to the present invention. Therefore, the processing sequence of FIG. 8 may include the lens communication processing or the like after live view image display processing of step S402.

Next, in step S403, the signal processing control section 11 communicates with the lens control section 21 via the communication sections 12 and 22 to monitor a signal from the second turning detection section 27b, and checks an operation state the of the zoom ring 23b. Here, if the operation of the zoom ring 23b is checked, the flow proceeds to a process of step S406. On the other hand, if the operation of the zoom ring 23b is not checked, the flow proceeds to a process of step S404.

In step S404, the signal processing control section 11 performs mode determination processing relating to a zoom control that is currently set. Here, if it is checked that the fine zoom adjustment mode has been already set, the flow proceeds to a process of step S451. On the other hand, if the normal zoom control mode is set, the flow proceeds to a process of step S405.

In step S405, the signal processing control section 11 communicates with the lens control section 21 via the communication sections 12 and 22 to monitor a signal from the first turning detection section 27a, and checks the operation state of the focus ring 23a. Here, if the operation of the focus ring 23a is checked, the flow proceeds to a process of step S409. On the other hand, if the operation of the focus ring 23a is not checked, the flow proceeds to a process of step S410.

In step S409, the signal processing control section 11 executes focus drive processing in accordance with an amount of turning operation of the focus ring 23a that is operated in the abovementioned process of step S405. The focus drive processing is normal focus drive control processing that is performed in accordance with a normal manual focus adjustment operation (manual focus operation; MF operation) (description thereof will be omitted).

Next, in step S410, the signal processing control section 11 monitors an instruction signal from the operation section 15, the touch panel 18b, and the like. Here, if the instruction signal of the image pickup action is checked, the flow proceeds to a process of step S411. On the other hand, if the instruction signal of the image pickup action is not checked, the flow returns to the process of step S401.

In step S411, the signal processing control section 11 performs a normal image pickup action. A processing sequence of the image pickup processing action is similar to a process performed by ordinary conventional cameras, and detailed description thereof will be omitted. The flow thereafter returns to the process of step S401.

The above processing sequence (S401 to S411) is a normal processing sequence performed when a normal image pickup is performed in the normal action mode. The following processing sequence represents a part relating to the present invention, that is, an action in the fine zoom adjustment mode in the camera 1 of the present embodiment.

That is, when the operation of the zoom ring 23b is checked in the abovementioned process of step S403 and the flow proceeds to a process of step S406, in this step S406, the signal processing control section 11 executes mode determination processing relating to the zoom control that is currently set (a process similar to the above process of step S404). Here, if it is checked that the fine zoom adjustment mode has been already set, the flow proceeds to a process of step S408. On the other hand, if the normal zoom control mode is set, for example, if the camera 1 is in a state immediately after activated, the flow proceeds to a process of step S407.

In step S407, the signal processing control section 11 monitors an instruction signal from the operation section 15, the touch panel 18b, the operation ring 23, and the like, to check whether or not the mode switch operation relating to the zoom control is performed. In this case, it is assumed that the mode switch operation of the zoom control is, for example, a predetermined operation or the like in which forward-and-back turning operation of the zoom ring 23b are repeated a plurality of times within a certain period of time, in the normal zoom control mode.

For example, a situation where the user performs an operation such as of repeating the forward-and-back turning operation of the zoom ring 23b a plurality of times within the certain period of time, more specifically for example, a situation where the user repeats the minute turning operation of the zoom ring 23b toward the wide side and the tele side, is considered that the user intends to perform the minute zooming operation using the zoom ring 23b. Since a minute drive control cannot be performed for the zooming operation using the zoom ring 23b because the zooming operation is based on power zoom control that is performed by on or off of a switch, which makes a control for obtaining a desired framing is difficult. Thus, as described above, when the predetermined operation such as the forward-and-back turning operation of the zoom ring 23b is performed, switching to the zoom control mode (fine zoom adjustment mode) is seamlessly performed, in which the fine zoom adjustment operation can be performed.

Note that, the mode switch operation of the zoom control may be, in addition to the above, for example, an operation of a predetermined operation member included in the operation section 15, an operation of a predetermined region of the touch panel 18b, or an operation performed in combination of a plurality of members, such as rotating the operation ring during pressing the operation member, or may be a simultaneous operation or the like of the two adjacent operation rings 23a and 23b.

In the process of this step S407, if the mode switch operation of the zoom control is checked, the operations is determined as a switch operation to the fine zoom adjustment mode, and the flow proceeds to a process of step S471. On the other hand, if the mode switch operation of the zoom control is not checked, the flow proceeds to a process of step S479. Here, the zoom position that is set at the time of performing the zoom control mode switch operation is configured to be set at a reference position for the fine zoom adjustment to be performed now, for example, at one of zoom end positions of the zoom range at the time of performing the fine zoom adjustment. Note that, the reference position at the time of performing the fine zoom adjustment is not limited thereto, and for example, the zoom position (reference position) that is set at the time of the mode switch operation may be set as a center position of the zoom range of the fine zoom adjustment.

In step S471, the signal processing control section 11 controls the display section 18 via the display control section 11d to display the display screen corresponding to the fine zoom adjustment mode while superimposing the display screen on the live view image displayed on the display section 18 (refer to FIG. 10).

Here, as a form of the display screen at the time of the fine zoom adjustment mode, for example, a display example shown in FIG. 10 will be described. In FIG. 10, the live view image including the object 101 being an image pickup target is continuously displayed on the display section 18. A fine zoom adjustment icon 61A is displayed, for example, at a substantial center portion close to a lower edge of the screen of FIG. 10 so as to be superimposed on this display. The fine zoom adjustment icon 61A is formed by, as shown in FIG. 10 for example, a shape that is imitative of an annular-shaped ring member (the zoom ring 23b or the like), and an operation direction instruction icon or the like that is imitative of an arrow and is displayed in the vicinity of this annular-shaped icon. Note that, in FIG. 10, "ZM" is an example of a character icon representing "zoom". In addition, "T" is an example of a character icon representing "tele (telephoto) direction", and "W" is an example of a character icon representing "wide (wide-angle) direction".

In addition, as shown in FIG. 10, rectangular frame-shaped small windows 18t and 18w are displayed at respective portions in the vicinities of the both corners close to the lower edge so as to sandwich the fine zoom adjustment icon 61A. These two small windows 18t and 18w are regions for displaying rough images of the image pickup range that changes in accordance with the zoom setting in the fine zoom adjustment mode. Specifically, the one small window 18t displays the image pickup range at the time of zooming toward the telephoto side. In addition, the other small window 18w displays the image pickup range at the time of zooming toward the wide-angle side.

In the above processing of step S471, the signal processing control section 11 further controls the display section 18 via the display control section 11d, to display an image of the image pickup range in accordance with the zoom setting that is currently set, that is, an image substantially the same as the live view image, on both of the above small windows 18t and 18w. The example shown in FIG. 10 shows a state immediately after the setting to the fine zoom adjustment mode. Therefore, an image equivalent to the live view image displayed on the display section 18 is displayed on both of the respective two small windows 18t and 18w. That is, since the state at this point in time is of immediately after setting the fine zoom adjustment mode, in which the zooming operation has not been performed yet, the same image is displayed on the respective small windows 18t and 18w.

Returning to FIG. 8, as described above, after the case where the mode switch operation is not performed in the process of step S407, and after the case where the mode switch processing is completed in the process of step S471, the flow proceeds to a process of step S479.

In step S479, the signal processing control section 11 performs normal zoom lens drive control processing in accordance with the turning operation of the zoom ring 23b. The flow thereafter proceeds to a process of step S410.

If the setting operation in the fine zoom adjustment mode is performed after the fine zoom adjustment mode is set by the above mode switch processing of step S471, the flow returns to step S404 from step S479 via step S410, and returns again to step S406. In the process of this step S406, it is checked that the fine zoom adjustment mode is currently set, and the flow proceeds to a process of step S408.

Then, in this step S408, the signal processing control section 11 monitors instruction signals from the operation section 15, the touch panel 18b, the operation ring 23 and the like, to check whether or not an operation to cancel the fine zoom adjustment mode is performed. In this case, as the fine zoom adjustment mode cancellation operation is, for example, an operation to perform the turning operation of the focus ring 23a and the turning operation of the zoom ring 23b, as well as an operation of a predetermined operation member in the operation section 15, a touch operation of a predetermined region of the touch panel 18b, or the like. Here, if the fine zoom adjustment cancellation operation is checked, the flow proceeds to a process of step S485. On the other hand, if the fine zoom adjustment cancellation operation is not checked, the flow proceeds to a process of step S481.

In the case where the action in the fine zoom adjustment mode is continuously performed, that is, in the case where a mode cancellation instruction is not checked in the process of above step S408, it is determined that the fine zoom adjustment mode is maintained, and the flow proceeds to a process of next step S481, in this step S481, the signal processing control section 11 monitors a signal from the second turning detection section 27b to check the turning direction of the zoom ring 23b. Here, if it is checked that the turning direction of the zoom ring 23b is a Tele direction, the flow proceeds to a process of step S482. On the other hand, if it is checked that the turning direction of the zoom ring 23b is a Wide direction, the flow proceeds to a process of step S483.

Next, in step S482, the signal processing control section 11 performs a predetermined zoom drive control in accordance with the turning operation of the zoom ring 23b in the Tele direction, and controls the display section 18 via the display control section 11d to display the corresponding live view image. At the same time, the signal processing control section 11 performs a display change processing (angle of view change processing) to the image pickup range on the small window 18t on the Tele side. In this case, a zoom position at the time when the turning operation of the zoom ring 23b in the Tele direction is stopped is set to the other zoom end position of the zoom range for the fine zoom adjustment. The flow thereafter proceeds to a process of step S489.

FIG. 11 shows one example of the display screen after the change in accordance with a process performed by the turning operation of the zoom ring 23b in the Tele direction (a process of step S482) when the display screen of the display section 18 is in the state of FIG. 10. As shown in FIG. 11, an object 101t that is enlarged as compared to FIG. 10 is displayed on the live view image, and an image corresponding thereto is displayed in the small window 18t. At the same time, in FIG. 11, the small window 18w displays a frame display 18wa for displaying an angle of view corresponding to the one zoom end position (reference position) that is set at the time of the processes of above steps S407 and S471. That is, the small window 18w of FIG. 11 displays the entire image pickup range at the time of the setting into a widest-angle end of the range within which the image pickup optical system of the camera 1 can pick up an image, and within the range, the image pickup range corresponding to the set zoom end position is displayed in the frame display 18wa.

In addition, in step S483, substantially as with the above step S482, the signal processing control section 11 performs a predetermined zoom drive control in accordance with the turning operation of the zoom ring 23b in the Wide direction, and controls display section 18 via the display control section 11d to display the corresponding live view image. At the same time, display change processing (angle of view change processing) of the image pickup range of the small window 18w on the Wide side is performed. In this case, a zoom position at the time when the turning operation of the zoom ring 23b in the Wide direction is stopped is set at the other zoom end position of the zoom range for the fine zoom adjustment. The flow thereafter proceeds to a process of step S489.

FIG. 12 shows one example of the display screen after the change in accordance with a process performed by the turning operation of the zoom ring 23b in the Wide direction (a process of step S483) when the display screen of the display section 18 is in the state FIG. 10. As shown in FIG. 12, an object 101w that is reduced as compared to FIG. 10 is displayed on the live view image, and an image corresponding thereto is displayed in the small window 18w. At the same time, in FIG. 12, an image of the image pickup range corresponding to one zoom end position (reference position) that is set at the time of the processes of above steps S407 and S471 is displayed in the small window 18t.

In step S489, the signal processing control section 11 sets a predetermined modification flag. Here, the modification flag is a flag indicating that (the both end positions of) the zoom range for the fine zoom adjustment in the fine zoom adjustment mode has already been set.

In such a manner, when the process of step S489 is completed, the zoom range in the fine zoom adjustment mode is performed. Next, the action when the fine zoom adjustment is performed in the fine zoom adjustment mode is as follows.

When the setting of the zoom range for the fine zoom adjustment mode is completed by the completion of the process of above step S489, the flow returns to step S403 after the determination of step S410, via step S479, and proceeds the process of next step S404. In the mode determination processing of this step S404, it is checked that the fine zoom adjustment mode has already been set, and the flow proceeds to a process of step S451.

Then, in this step S451, the signal processing control section 11 checks the modification flag. Here, if the modification flag is checked, the flow proceeds to a process of step S452. On the other hand, if the modification flag is not checked, the flow proceeds to a process of step S454.

In step S452, the signal processing control section 11 controls the zoom drive section 24a via the lens control section 21 to perform the zoom drive control of the zoom optical system by the zoom drive mechanism section 26a, and performs the angle of view change processing to set the zoom position of the zoom optical system to a substantial center of the zoom range whose both ends are set.

Here, FIG. 13 and FIG. 14 show examples of a display state of the display section 18 when the zoom drive control is performed in the fine zoom adjustment mode. FIG. 13 is an example of the display screen after the state of FIG. 11, that is, the display screen at the time when the state of FIG. 11 is set where one of the zoom ends is set at the zoom position of FIG. 10 and the other zoom end is turned in the telephoto direction, and the zoom position is set at a substantial center of the zoom range. In addition, FIG. 14 is an example of the display screen after the state of FIG. 12, that is, the display screen at the time when the state of FIG. 12 is set where one of the zoom ends is set at the zoom position of FIG. 10 and the other zoom end is turned in a wide direction, and the zoom position is set at a substantial center of the zoom range.

Note that, as shown in FIG. 13 and FIG. 14, after the setting of the zoom range is completed in the fine zoom adjustment mode, guide displays such as arrows for indicating the rotation directions are displayed in the vicinity of the icon 61A in order to assist the fine zoom adjustment operation. Here, arrow displays are displays for indicating the rotation directions. The guide displays such as "T" and "W" provided to these arrow directions are displays that means "Tele" and "Wide", respectively. Therefore, the user can intuitively understand how to operate the fine zoom adjustment only by looking the display of the display section 18, and for example, the display is devised such that the user performs only the ring turning operation according to the arrow displays in a desired direction in which the user wants to perform the fine adjustment.

Next, in step S453, the signal processing control section 11 clears the modification flag, and the flow proceeds to a process of next step S454.

In the camera 1 of the present embodiment, the operation for the fine zoom adjustment is performed using the focus ring 23a. Thus, in a process of next step S454, the turning operation of the focus ring 23a is checked.

That is, in step S454, the signal processing control section 11 communicates with the lens control section 21 via the communication sections 12 and 22 to monitor a signal from the first turning detection section 27a, and check the operation state of the focus ring 23a. Here, if the operation of the focus ring 23a is checked, the flow proceeds to a process of step S455. On the other hand, if the operation of the focus ring 23a is not checked, the flow proceeds to a process of step S410.

In step S455, the signal processing control section 11 controls the zoom drive section 24a via the lens control section 21 in accordance with the turning operation of the focus ring 23a, to perform a predetermined zoom drive control of the zoom optical system by the zoom drive mechanism section 26a.

That is, in the camera 1 of the present embodiment, if the focus ring 23a is operated in the fine zoom adjustment mode, the zoom drive control in accordance with a turning operation instruction of the focus ring 23a is performed. The flow thereafter proceeds to a process of step S410.

Note that, if the mode cancellation instruction is checked in the abovementioned process of step S408 and the flow proceeds to a process of next step S485, in this step S485, the signal processing control section 11 performs mode change processing to change the setting of zoom control mode to the normal zoom control mode.

Next, in step S486, the signal processing control section 11 controls the display section 18 via the display control section 11d to clear the displays of the icon displays (61A, 18t, 18w and the like) for the fine zoom adjustment mode. Thereby, the display of the display section 18 is returned to the state where only the normal live view image is displayed, that is, the state shown in FIG. 9. The flow thereafter proceeds to a process of step S479.

In addition, if it is checked that the action mode other than the image pickup mode is set to the camera 1 in the abovementioned process of step S401 and the flow proceeds to a process of step S421, in this step S421, the signal processing control section 11 determines that the current action mode is the reproduction mode, and performs a predetermined reproduction processing. Here, the predetermined reproduction processing is reproduction processing performed by conventional cameras. Since this reproduction processing is a part that does not directly relate to the present embodiment, the detailed description thereof will be omitted. In addition, since a processing sequence of the case where the action mode other than the reproduction mode is set is a part that does not directly relate to the present embodiment either, illustration and detailed description thereof will be omitted. When this reproduction processing is completed, the flow returns to the process of abovementioned step S401.

Figure 15:
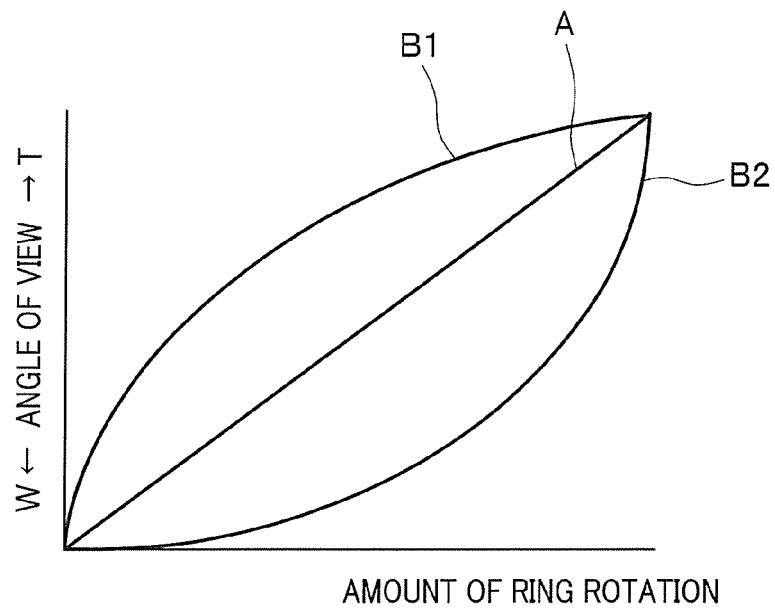
FIG. 15 is a diagram showing a relationship between an amount of ring rotation of the focus ring and an amount of change in an angle of view in the fine zoom adjustment mode in the image pickup apparatus (camera) of the second embodiment of the present invention.

Note that a relationship between an amount of ring rotation of the focus ring 23a and an amount of change in angle of view in the fine zoom adjustment mode may be controlled into, as shown in FIG. 15 for example, a relationship of 1:1 (reference character A in the drawing). Alternately, the relationship may be controlled such that the fine adjustment can be coarsely performed near a zoom end point close to the wide, and be finely performed near a zoom end close to the telephoto (reference character B2 in the drawing). On the other hand, the relationship may be controlled such that the fine adjustment can be finely performed near the zoom end point close to the wide, and the angle of view coarsely changes near the zoom end close to the telephoto (reference character B1 in the drawing).

Figure 16:
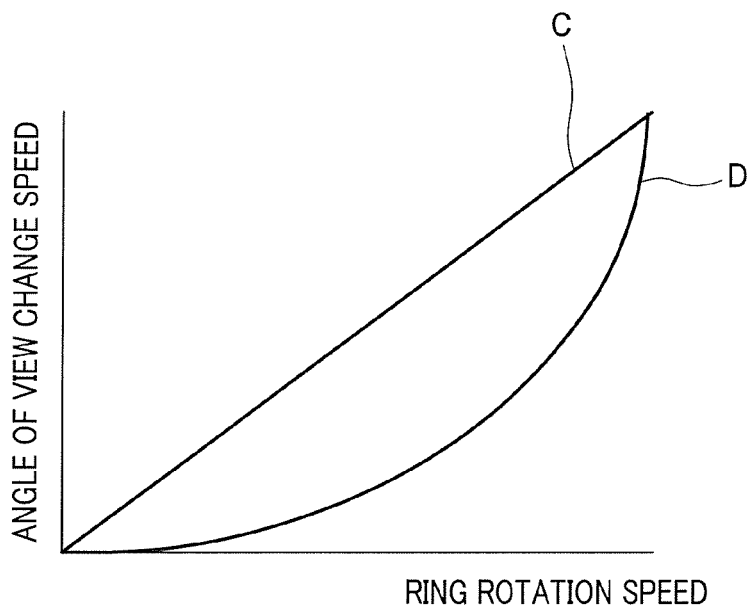
FIG. 16 is a diagram showing a relationship between a ring rotation speed of the focus ring and an angle-of-view change speed in the fine zoom adjustment mode in the image pickup apparatus (camera) of the second embodiment of the present invention.

In addition, a relationship between a ring rotation speed and an angle-of-view change speed may be controlled in a linear relationship (reference character C in the drawing), as shown in FIG. 16, or may be controlled such that the change in the angle of view is made small when a ring is turned at a low speed, whereas the change in the angle of view is made large when a ring is rotated at a high speed (reference character D in the drawing).

As described above, according to the second embodiment, the effect similar to that of the abovementioned first embodiment can be obtained.

Note that the above respective embodiments exemplify the configuration of the image pickup apparatus (camera), as means for achieving zooming function, having a so-called optical zooming function of enlarging or reducing the object image that is formed by the image pickup optical system, by moving the zoom optical system of the image pickup optical system forward and backward in the optical axis direction, but the image pickup apparatus to which the present invention can be applied is not limited to this form. For example, the image pickup apparatus may be an image pickup apparatus (camera) having a so-called digital zooming function of enlarging or reducing an image including an object by performing a predetermined image processing to an image signal outputted from an image pickup device. Furthermore, the present invention can be easily applied to an image pickup apparatus (camera) having a configuration that has the optical zooming function and the digital zooming function, and can seamlessly use the both functions.

[Third Embodiment]

A third embodiment of the present invention will be next described. The present embodiment illustrates an example of one form of focusing control that is applied to an image pickup apparatus (camera) having a configuration substantially similar to the respective abovementioned embodiments. Therefore, a basic configuration of an image pickup apparatus (camera) itself of the present embodiment is similar to that of the abovementioned first embodiment, and only a camera control sequence slightly differs from that of the abovementioned first embodiment. Therefore, with respect to components similar to those of the abovementioned first embodiment, illustration will be omitted and description will be made with the same numeral characters with reference to FIG. 1 and FIG. 2. In addition, with respect to a similar processing sequence (refer to FIG. 3), illustration and description thereof will be omitted, and only different parts thereof will be described below.

A focusing control (focusing, focus control, focus adjustment) in the camera 1 as the image pickup apparatus of the present embodiment is basically an autofocus (auto focus adjustment) control (hereafter, abbreviated as AF control). A schema of this AF control is started by, for example, a half press operation of a shutter release button included in the operation section 15 on the camera body 10 side, as a trigger. In this case, contrast AF control, image plane phase difference AF control, or the like is appropriately performed based on the image data outputted from the image pickup device 13 (normal AF control mode). In addition thereto, in this state, a user manually performs the turning operation of the focus ring 23a while maintaining the half press operation of the shutter release button, so as to perform the focusing (focus control, or focus adjustment) (manual focusing; MF) in accordance with the turning operation. That is, the image pickup apparatus has so-called an AF+MF control mode that performs a control such that a shift from the AF control to manual focus (manual focus adjustment) control (hereafter, abbreviated as MF control) can be seamlessly made without performing a switch operation of the focus mode.

Furthermore, the camera 1 of the present embodiment has a focus guide mode as one of other forms of the focus mode.

In particular, another specification using the ring operation section for focusing control (focusing) is proposed here, and this is because we have thought that, if the operation member is originally assumed to be used for focusing, switching to a mode associated therewith will not cause the user's confusion. As will be described below, since the focus guide mode includes a nonlinear control (refer to FIG. 21) and assistant guide display (refer to FIG. 19, FIG. 26, and the like), it is needless to say that improvement taking over this feature can be made, such as nonlinear zoom control, and zoom guide mode indicating which range is to be zoomed at which ring rotation position. However, we will concentrate on describing focus position control, about which the user is likely to be confused. The focus control and the zoom control are both considered to be conceptually similar in a sense that the controls perform position adjustment in an optical axis direction of a lens group configuring the optical system, and both of the controls are positional control of the optical system. This position adjustment may be referred to as one of image pickup parameter adjustments.

In this focus guide mode, the image pickup apparatus performs distance distribution determination (distance measurement) action in a predetermined region in the image pickup screen, upon receiving the output from the image pickup section, sets a plurality of focus zones (long-distance view, middle-distance view, short-distance view and the like) in accordance with the distance measurement result, and displays a focus guide icon 51 (refer to FIG. 18 and FIG. 19 to be described hereafter) corresponding to the set focus zones, on the display section 18. When a user performs a specification operation of a desired focus zone using the focus guide icon 51, the focusing (focus control or focus adjustment) control is performed to the specified focus zone. At this point, focusing (step focusing) control is performed by stages across the respective focus zones.

The focus guide mode in the camera 1 of the present embodiment is configured so as to seamlessly shift to the focus mode when the user performs a predetermined operation (more specifically, as will be described hereafter, simultaneous turning operation of the two operation rings 23a and 23b or the like) in the other focus modes (normal AF control mode, MF control mode, or AF+MF control mode), for example (details will be described hereafter). In particular, there are advantages in that, if this function is activated in the manual focus mode, the user can easily select from between normal MF in which linear focusing can be performed and the focus guide mode which is nonlinear or with assistant guide display, through the ring operation, and in that the same operation can manipulate the same parameter even if the user makes an error in respective operations, which will not cause the user's confusion. That is, only switching among relationships between an amount of operation and a value of parameter is performed. In addition, a control similar to operation prohibition is enabled by holding changes in the value of parameter down to zero.

In such a manner, with respect to focusing (focus control, or focus adjustment) control in the camera 1 of the present embodiment, for example, a plurality of focus modes are provided such as a normal AF control mode to perform only AF control, a MF control mode to perform only MF control, an AF+MF control mode that can seamlessly shift from the AF control to the MF control, and focus guide mode, and the plurality of focus modes are configured to be performed by switching among them as appropriate.

The camera control processing sequence of the camera 1 in the present embodiment is similar to the processing sequence that has been described in the abovementioned first embodiment and illustrated in FIG. 3. In the present embodiment, the process of step S117 (subroutine) is different in this camera control processing sequence.

Figure 17:
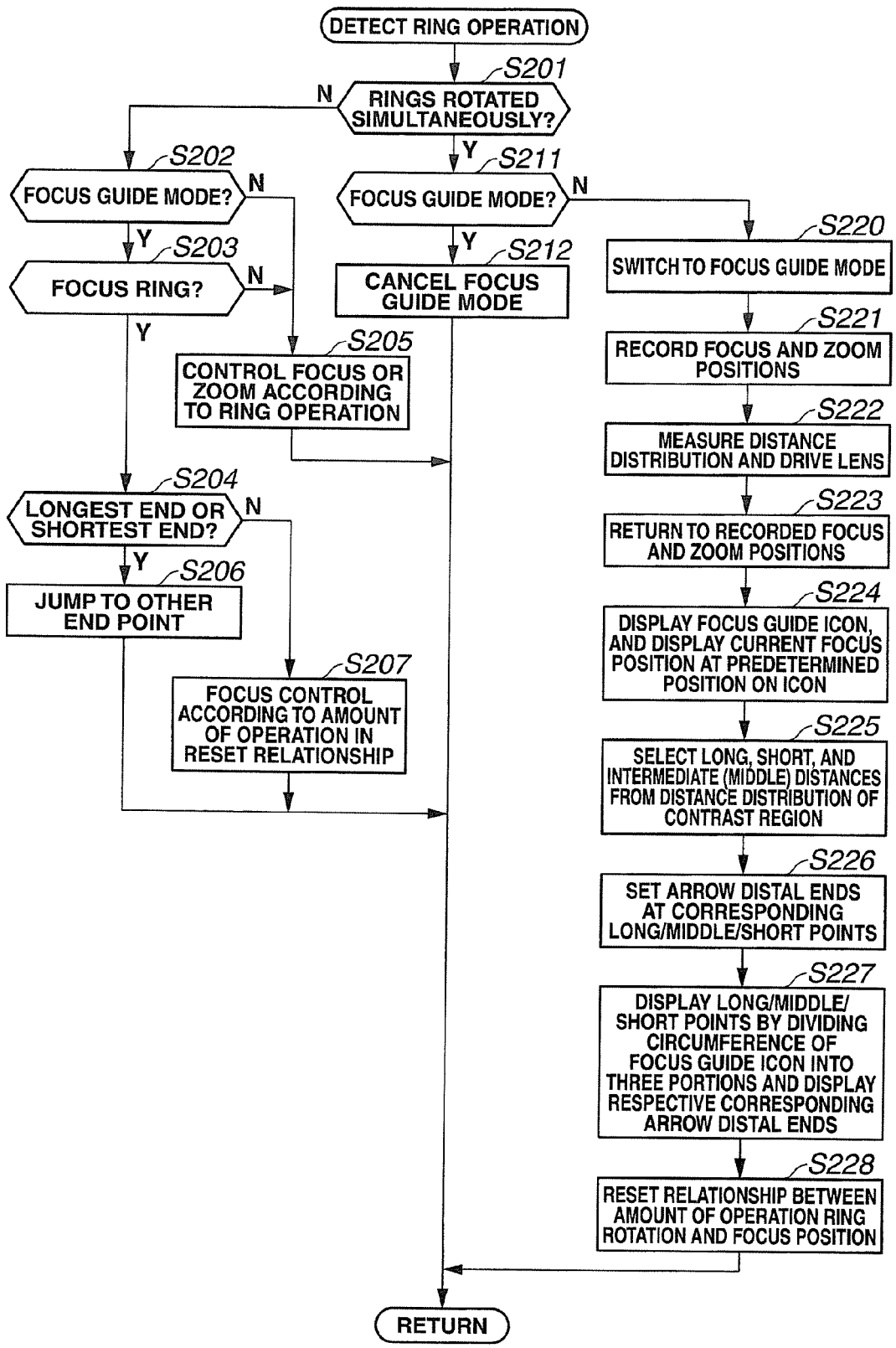
FIG. 17 is a flowchart showing a subroutine (a process of step S117 of FIG. 3) included in the camera control processing sequence in an image pickup apparatus (camera) of a third embodiment of the present embodiment.

FIG. 17 is a flowchart showing a subroutine (the process of step S117 of FIG. 3) included in the camera control processing sequence (refer to FIG. 3) in the image pickup apparatus (camera) of the present embodiment.

The subroutine (the process of step S117 of FIG. 3) of the ring operation detection processing in the focus guide mode in the camera 1 of the present embodiment will be described below in detail with reference to FIG. 17.

As described above, when any one of the above two operation rings 23a and 23b is operated in the process of step S116 in the camera control processing sequence shown in FIG. 3, the flow shifts to the process of step S117, that is, the processing sequence of FIG. 17.

First, in step S201 of FIG. 17, the signal processing control section 11 checks whether or not a simultaneous turning operation of the above two operation rings 23a and 23b is performed, based on a detection result from the abovementioned process of step S116. Here, if it is checked that the simultaneous turning operation of the operation rings 23a and 23b is performed, the signal processing control section 11 prohibits a control corresponding to the turning operation of the respective operation rings 23a and 23b, and causes the flow to proceed to a process of next step S211. Here, the reason why the control corresponding to the turning operations of the respective operation rings are prohibited when the simultaneous turning operation of the above two operation rings 23a and 23b is detected, is as follows. That is, if the simultaneous turning operation of the two operation rings 23a and 23b is detected, it cannot be determined whether the operations are intentional or due to an operational error. For this reason, the control corresponding to the simultaneous turning operation is prohibited in a stage of the process step, in order to prevent a focus setting or a zoom setting that is currently set from being unintentionally deviated even if the simultaneous turning operation is due to the operational error.

On the other hand, here, if it is checked that the simultaneous turning operation of the operation rings is not performed, for example, if an operation of only one of the two operation rings 23a and 23b is checked, the flow proceeds to a process of step S202.

In step S211, the signal processing control section 11 checks whether or not the focus guide mode is currently set. Here, if the focus guide mode is already currently set, the flow proceeds to a process of step S212.

Next, in step S212, the signal processing control section 11 cancels the focus guide mode that is currently set, and makes the setting to a normal AF control mode, for example, from among the focus modes. The flow thereafter returns to the original processing sequence (FIG. 3), and proceeds to a process of step S118 of FIG. 3. Note that, in the above process of step S212, the signal processing control section 11 may be configured to, before the cancellation processing of the focus guide mode, display a warning of the cancellation processing on the display section 18 to ask the user to accept or reject the cancellation processing.

On the other hand, in the abovementioned process of step S211, if it is checked that the focus guide mode is not currently set but the normal focus mode is set, the flow proceeds to a process of step S220.

Figure 18:
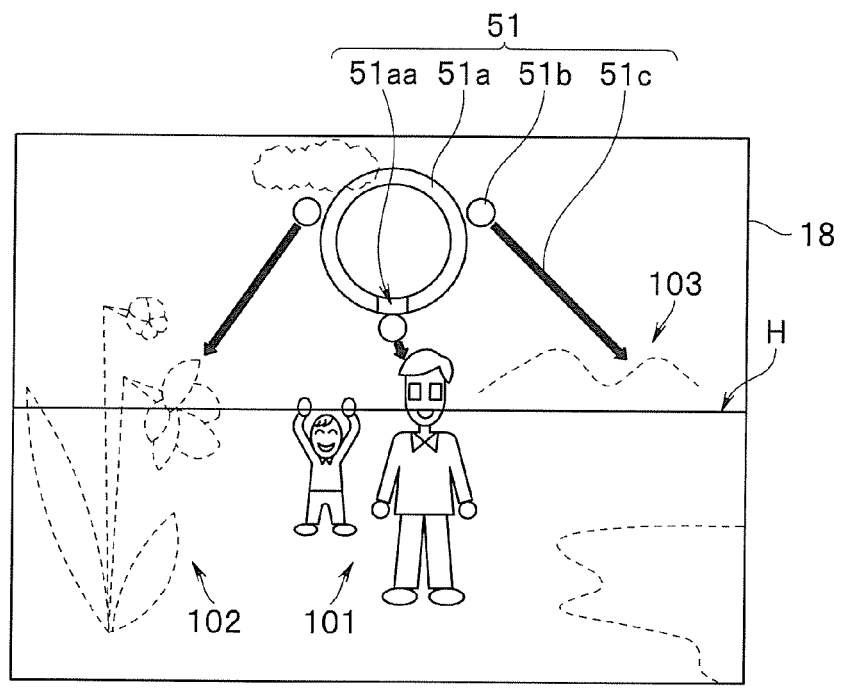
FIG. 18 is a diagram showing one example of the live view image that is displayed on the display section when the user picks up an image of the image pickup target shown in FIG. 2 in the focus guide mode using the image pickup apparatus (camera) of the third embodiment of the present invention.
Figure 19:
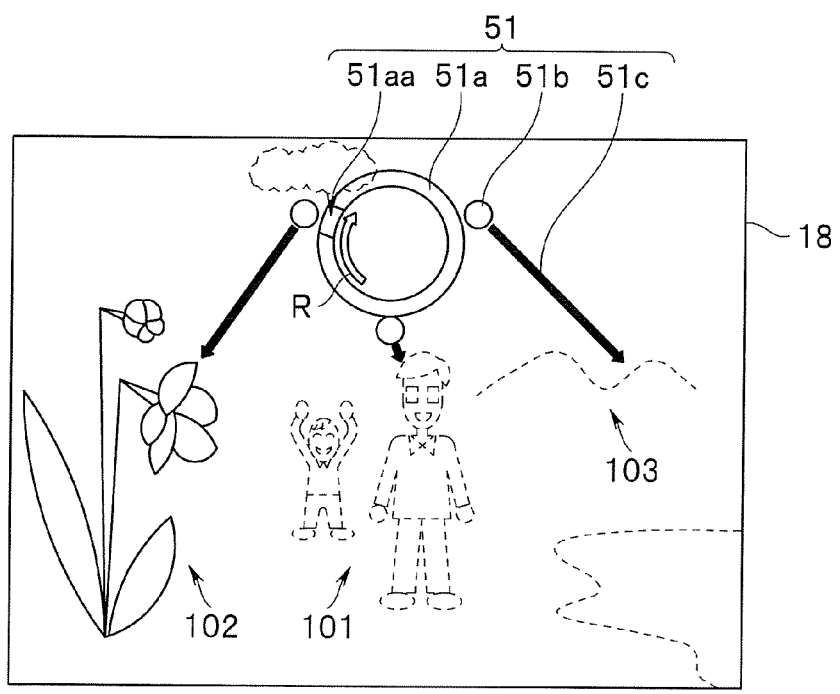
FIG. 19 is a diagram showing a state after a focus guide icon is operated from the state of FIG. 18.

Here, a display screen of the focus guide mode and a schema in the action will be described. FIG. 18 and FIG. 19 show one example of the live view image that is displayed on the display section 18 when the user is about to pick up an image of the image pickup target shown in abovementioned FIG. 2 with the camera 1 of the present embodiment that is set into the focus guide mode.

As described above, in the case where an image pickup target is such a situation shown in FIG. 2, as shown in FIG. 18 and FIG. 19, a plurality of objects are to be included in the image pickup screen. In this case, if distances from the camera 1 to respective objects differ, the objects are not always focused across the entire screen. Specifically, as described above, for example, in the case of the flower or the like 102 in the short-distance view at a short distance from the camera 1, the mountain or the like 103 in the long-distance view at a long distance, and the persons or the like 101 in the middle-distance view at a middle distance therebetween, the focus adjustment to any one of these three objects brings the other two object into an out-of-focus state. To depict this, in FIG. 18 and FIG. 19, the objects that are subjected to the focus adjustment among the plurality of objects are shown by solid lines, and the objects (out-of-focus objects) that are not subjected to the focus adjustment are shown by dotted lines. Specifically, FIG. 18 shows a state of focusing, where the persons or the like 101 in the middle-distance view are outlined by the solid lines and the other objects are outlined by the dotted line. FIG. 19 shows a state of focusing, where the flower or the like 102 in the short-distance view is outlined by the solid line and the other objects are outlined by the dotted lines. The image pickup parameter used here is a focusing, and the effect thereof corresponds to a (object) position on the above display section. Since the display control section displays a direction or a rotation position of the rotational operation, the user can understand a relation between the operation and the effect.

In this case, the distances from the camera 1 to the respective objects are calculated as follows. First, in the image pickup screen, for example, a horizontal line H (refer to FIG. 18) positioned at a center in a vertical direction is defined. Then, a predetermined region including this horizontal line H is set as a target, an distance measurement action with respect to the plurality of objects is performed by detecting contrast in the image on the horizontal line H from a left end to a right end of the screen, using distance distribution or a distance determination (distance measurement) action, such as contrast AF processing in which AF processing is performed based on an output from the image pickup device 13.

Note that, the distance measurement action performed here may use, in addition to the abovementioned contrast AF processing, for example, image plane phase difference AF processing in which AF processing is performed using AF phase difference pixel provided on an image pickup surface of the image pickup device 13. Furthermore, various methods are known such as an optical projection method or a method using twin lens.

Figure 20A:
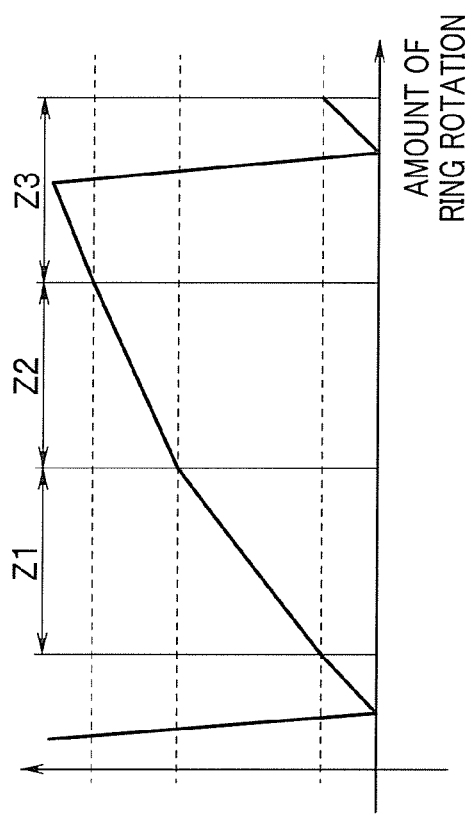
FIG. 20A is a graph showing a distance distribution determination result obtained at the time of setting the image pickup apparatus (camera) of the present embodiment to the focus guide mode to pick up an image.
Figure 20B:
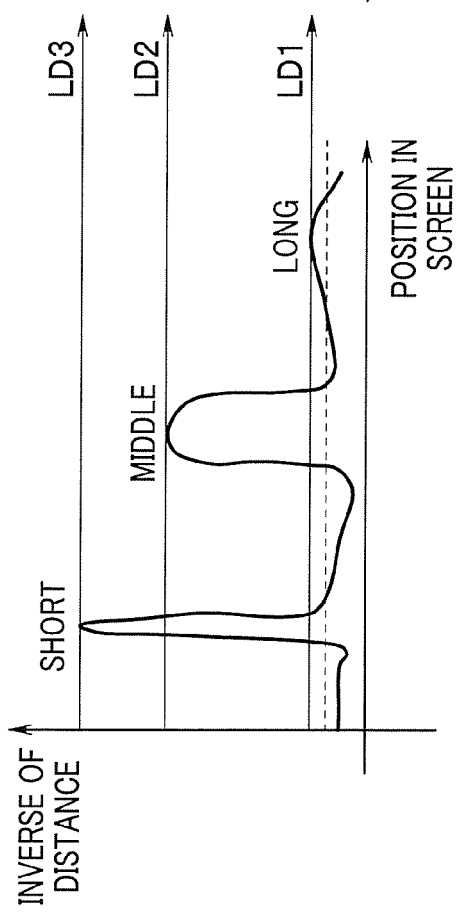
FIG. 20B is a graph showing an amount of ring rotation that is created based on the distance measurement result of FIG. 20A.

One example of a graph of a distance distribution determination (distance measurement) result obtained in such a manner is shown in FIG. 20A and FIG. 20B. Here, FIG. 20A shows an example of the distance determination result (distance distribution) with respect to the objects in accordance with distribution of contrast peaks obtained for each focusing position (corresponding to an inverse of distance) in the predetermined region (horizontal line H), as a result of measuring the distribution of the distance measurement result of a predetermined region (horizontal line H) in the image pickup range (refer to FIG. 18) of the case where the image pickup target shown in FIG. 2 is picked up. FIG. 20B is a graph showing a relationship between the amount of ring rotation and a position for focusing, which is created based on the distance measurement result of FIG. 20A.

In the normal case, the inverse of distance to the object is proportional to an amount of lens feeding (amount of ring rotation). In addition, the shorter a distance to an object is, the higher a contrast thereof tends to have. On the other hand, since the longer a distance to an object is, the lower a contrast thereof tends to have, an region of such a lower contrast is set to be infinity (∞). Taking these factors into account, in the graph of FIG. 20A, a vertical axis shows inverse of distance based on the distance measurement result such as a distribution of optimal focus position, and distance determination, and a horizontal axis shows position in the predetermined region (on the horizontal line H) in the screen. The amount of ring rotation is set based on this distance distribution determination (distance measurement) result, as shown in FIG. 20B. In this case, a plurality of (three in the present embodiment) focus zones are set at positions on the horizontal line H, including a predetermined focusing range Z1 centered about a focused point for the short-distance view (the flower or the like 102), likewise a predetermined focusing range Z2 centered about a focused point for the middle-distance view (the persons or the like 101), and likewise a predetermined focusing range Z3 centered about a focused point for the long-distance view (the mountain or the like 103). Then, when a certain focus zone is specified, drive control of the focus optical system is performed such that a prescribed position within a range of the focus zone is focused on. That is, within respective focus zones, minute focusing (focus control, or focus adjustment) is not performed regardless of the amount of ring rotation, and the focus optical system is fixed to the prescribed position. Then, the focus optical system is controlled into each of the respective prescribed positions by stages between the respective focus zones. In this case, the drive control is smoothly performed so as to make a gentle slope in the graph.

Figure 21:
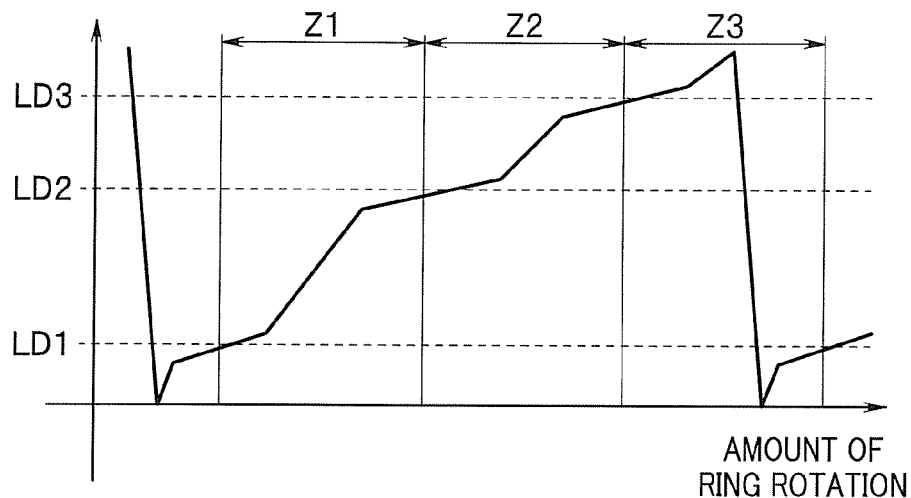
FIG. 21 is a graph showing another modification of the amount of ring rotation that is created based on the distance distribution determination result of FIG. 20A.

Note that, apart from this form, a focus control shown in FIG. 21 may be performed, for example. In a modification shown in FIG. 21, the drive control is performed such that fine focus adjustment can be performed in accordance with the amount of ring rotation within a slight range, also within the respective focus zones.

Then, FIG. 20B and FIG. 21 illustrate that the focus zone can be seamlessly changed in one action from a state where a shortest distance (called shortest end) corresponding to the short-distance view is focused on, or a state a longest distance (infinity; ∞: called longest end) corresponding to the long-distance view is focused on, to the other end. That is, the focused state is set so as to reach the longest end via an intermediate position when the user continues to rotate the focus ring 23a from the shortest end, and so as to jump from the longest end to the shortest end when the user further continues to rotate the focus ring 23a from this state. That is, conventional focus controls are performed in one direction between the shortest end and the longest end. Therefore, the focused state has been controlled so as to, when the focused state reaches one end point, always return to the other end point via the intermediate position. In contrast, the operation ring in the present embodiment is configured to rotate infinitely, and the focus control is performed such that the focused state directly jumps from the one end point to the other end point.

Figure 22:
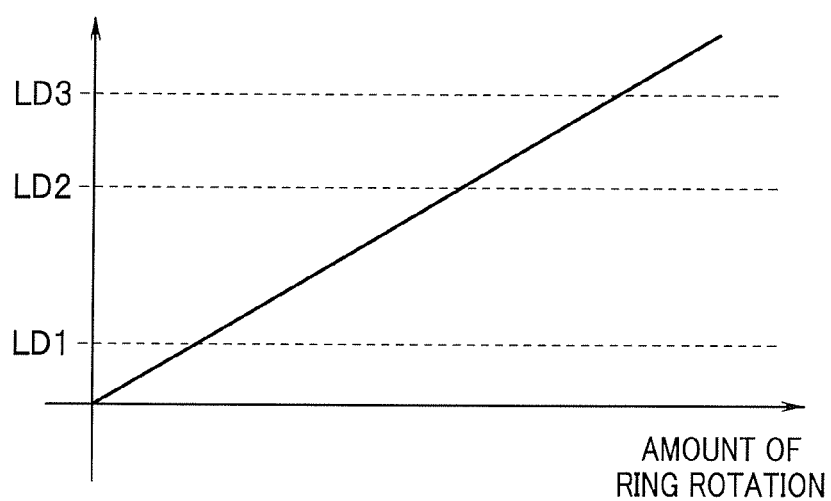
FIG. 22 is a diagram showing a relationship between a focus drive and the amount of ring rotation in the normal focus mode in the image pickup apparatus (camera) of the present embodiment.

On the other hand, under a setting for a normal focus mode, as shown in FIG. 22, the MF control can be performed by the rotation of the focus ring 23a. In this case, when the user continues to rotate the focus ring 23a from the focused state of the shortest end, the focused state reaches the longest end in the end via the intermediate position. At this point, the amount of ring rotation keeps a certain slope from the focused state of the shortest end to the focused state of the longest end. Then, the focused state is set so as to, when the focused state is at the shortest end or the longest end, stay in the focused state at this point in time, that is, stay at the shortest end or the longest end even if the user continues to rotate the focus ring 23a.

Note that, in the above example, the description has been made taking the horizontal line H as an example of the region to which the distance distribution determination (distance measurement) is performed, but the distance measurement target region is not limited to this form, and may be set in a various forms such as the entire image pickup screen, a predetermined region in a center portion of the image pickup screen.

Then, when the focus guide mode is set, as shown in FIG. 18 and FIG. 19, the focus guide icon 51 is displayed at a predetermined region in the display screen of the display section 18. The focus guide icon 51 is constituted by, for example, an annular portion 51a, a plurality of (three in the present embodiment) indicators 51b that are displayed on a periphery of this annular portion 51a and correspond to the above focus zones, arrows 51c extended from the respective indicators 51b, and an identification portion 51aa, on the above annular portion 51a, for clearly indicating one of the plurality of indicators 51b. Shape data of this focus guide icon 51 is controlled so as to be stored, for example, in a predetermined storage area of the storage section 14 or the like in advance, and read out as appropriate to be used.

The focus guide icon 51 is a display imitative of an annular-shaped operation member. That is, the user can perform a desired operation by performing a touch and slide operation or the like to a position on the display section 18 corresponding to the focus guide icon 51, via the touch panel 18b. For example, in the state shown in FIG. 18, the three indicators 51b are displayed on the periphery of this annular portion 51a, which indicate that the three focus zones are to be selected. The arrows 51c are extended from the respective indicators 51b toward the objects corresponding to the respective focus zones. Then, in the state of FIG. 18, the identification portion 51aa displayed on the annular portion 51a clearly indicates the indicator 51b corresponding to the focus zone for the persons or the like 101 in the middle-distance view. Therefore, a state where the focus zone of the middle-distance view is focused on is displayed on the screen of the display section 18 in the state of FIG. 18.

When the user performs a slide operation in an R direction of the arrow to the annular portion 51a through the touch panel 18b from this state of FIG. 18, as shown in FIG. 19, the displayed image of the display section 18 is brought into a state where the focus zone of the short-distance view is focused on.

In addition, apart from this, a form may be employed in which a dial-like member having a form similar to the focus guide icon 51 is provided in the camera body 10, and when this dial-like member is operated, a display of the focus guide icon 51 of the display section 18 changes interlocking with this.

An action in such a focus guide mode is implemented by the processing sequence of FIG. 17. That is, in FIG. 17, if the simultaneous turnings of the two operation rings 23a and 23b are checked in the abovementioned process of step S201 and it is checked that the focus guide mode is not currently set in the abovementioned process of step S211, and the flow proceeds to a process of step S220, in this step S220, the signal processing control section 11 switches the focus control to the focus guide mode.

That is, in the present embodiment, when the simultaneous turning operation of the operation rings is detected, the signal processing control section 11 always switches the focus mode to the focus guide mode while prohibiting the control of the respective operation rings 23a and 23b to prevent the focus setting and zoom setting that have already been set from being deviated. Therefore, it is conceivable that the detected simultaneous turning operation is an operational error that is not intended by the user and switching to the focus guide mode is not intended either. In such a case, the signal processing control section 11 may be configured to, after the process of abovementioned step S220, cancel the switched focus guide mode by, for example, a predetermined cancellation operation to return to an action mode in which a normal focus control is performed.

In addition, the method for switching to the focus guide mode is not limited to the simultaneous turning operation of the operation rings as described above, and may be to operate a predetermined operation member provided in the camera body 10 or the lens barrel 20, for example.

Next, in step S221, the signal processing control section 11 controls the lens control section 21 via the communication sections 12 and 22 to read output signals from the zoom lens position detection section 25a and the focus lens position detection section 25b, and temporarily stores the focus position and the zoom position that are currently set, in the temporary storage section 16.

Next, in step S222, the focus processing section 11a of the signal processing control section 11 controls the focus drive section 24b via the communication sections 12 and 22, and the lens control section 21 to cause the focus drive mechanism section 26b to drive the focus optical system, and perform the distance distribution determination processing (refer to FIG. 20A).

Next, in step S223, the signal processing control section 11 performs drive control in which the focus optical system and the zoom optical system in the lens 26 are returned to the original state based on temporarily stored information in the abovementioned process of step S221.

In step S224, the signal processing control section 11 controls the storage section 14, the display section 18 and the like via the image processing section 11b and the display control section 11d to display the annular portion 51a of the focus guide icon 51 in a predetermined region of the display section 18. At the same time, the currently set focus position is displayed at a corresponding position in the focus guide icon 51. That is, the identification portion 51aa is displayed at a corresponding position in the annular portion 51a.

Next, in step S225, the signal processing control section 11 controls the focus processing section 11a to select and set the three focus zones of the long-distance view, the short-distance view, and the middle-distance view based on the distance distribution determination result that is obtained in the abovementioned process of step S222 (refer to FIG. 20B).

Next, in step S226, the signal processing control section 11 controls the storage section 14, the display section 18 and the like via the image processing section 11b and the display control section 11d, to set distal ends of the arrows 51c with respect to the points corresponding to the set long-distance view, middle-distance view, and short-distance view.

Next, in step S227, the signal processing control section 11 controls the storage section 14, the display section 18 and the like via the image processing section 11b and the display control section 11d, to divide the focus guide icon 51 into three parts in a circumferential direction and display the plurality of the indicators 51*b* indicating the respective points of the long-distance view, the middle-distance view, and the short-distance view. At the same time, the arrows 51*c* that correspond to the plurality of indicators 51*b*, respectively, are displayed.

Next, in step S228, the signal processing control section 11 causes the focus processing section 11*a* to reset a relationship between the amount of ring rotation (operation instruction) of the focus ring 23*a* and the focus position (refer to FIG. 20B and FIG. 21). The flow thereafter returns to the original processing sequence (FIG. 3) and proceeds to a process of step S118 of FIG. 3.

On the other hand, if it is checked that the simultaneous turning operation is not performed in the abovementioned process of step S201 and the flow proceeds to a process of step S202, in this step S202, the signal processing control section 11 checks whether or not the focus guide mode is currently set. Here, if it is checked that the focus guide mode has been already set, the flow proceeds to a process of step S203. On the other hand, if it is checked that the focus guide mode is not currently set but the normal focus mode is set, the flow proceeds to a process of step S205.

In step S203, the signal processing control section 11 checks whether or not the turning operation of the focus ring 23*a* of the above two operation rings 23*a* and 23*b* is performed, based on the detection result from the abovementioned process of step S116 of FIG. 3. Here, if it is checked that the turning operation of the focus ring 23*a* is performed, the flow proceeds to a process of next step S204. On the other hand, if it is checked the turning operation of the operation ring other than the focus ring 23*a* is performed, that is, the turning operation of the zoom ring 23*b* is performed, the flow proceeds to a process of step S205.

Here, in step S205, the signal processing control section 11 performs the focus control or the zoom control with respect to the performed ring operation. Since these focus control and zoom control are similar to controls performed by ordinary conventional cameras, detailed descriptions thereof will be omitted. The flow thereafter returns to the original processing sequence (FIG. 3) and proceeds to a process of step S118 of FIG. 3.

On the other hand, if the turning operation of the focus ring 23*a* is checked in the abovementioned process of step S203 and the flow proceeds to a process of step S204, in this step S204, the signal processing control section 11 checks whether or not the currently set focus position is set at any one of the longest end and the shortest end. Here, if it is checked that the focus position is set at any one of the longest end and the shortest end, the flow proceeds to a process of next step S206. On the other hand, if the set focus position is neither the longest end nor the shortest end, the flow proceeds to a process of step S207.

In step S206, the signal processing control section 11 sets the focus position at an end point that is different from the set focus position. The flow thereafter returns to the original processing sequence (FIG. 3) and proceeds to a process of step S118 of FIG. 3.

Alternately, in step S207, the signal processing control section 11 performs the focus control in accordance with the reset relationship, that is, the amount of operation of the focus ring 23*a* through the abovementioned process of step S203. The flow thereafter returns to the original processing sequence (FIG. 3) and proceeds to a process of step S118 of FIG. 3.

Note that, in the present embodiment, although the simultaneous turning operation of the two operation rings 23*a* and 23*b* that are constituted by the annular shape operation members is considered as a trigger for switching the focus mode, but the present embodiment is not limited to the form. For example, a form may be employed in which a simultaneous operation of a plurality of operation members including a press button and a slide operation member is a trigger for switching between the modes.

As described above, according to the third embodiment, the simultaneous operation of the two operation rings 23*a* and 23*b* that are provided adjacent to each other due to downsizing performs seamless switching to a novel action mode (more specifically, the focus guide mode among the focus controls). In this case, the camera is configured so as to prohibit the normal control allocated to the respective operation rings 23*a* and 23*b* when the simultaneous operation of the two operation rings 23*a* and 23*b* is detected. In such a manner, since the normal control allocated to the respective operation rings 23*a* and 23*b* is prohibited when the two operation rings 23*a* and 23*b* are simultaneously operated, an accident such as a setting deviation can be prevented even if the simultaneous operation of the two operation rings 23*a* and 23*b* is due to an operational error, and at the same time, the focus control can be seamlessly shifted to the focus guide mode.

In addition, in the focus guide mode that is newly provided, the distance distribution determination with respect to the plurality of objects in the screen is performed to set the plurality of focus zones in accordance with the distances from the camera 1 to the objects, and the user selects the desired focus zone through the predetermined operation to focus (focus control, or focus adjustment) on the objects included in the selected focus zone. Therefore, with the focus control in this focus guide mode, an object desired by the user can be easily focused on. The focusing on a desired object can be thereby performed more easily as compared with the focus control performed in the normal AF control mode or in the MF control mode with a manual operation, which allows for widening image expression and obtaining a wide range of picked-up images.

[Fourth Embodiment]

A fourth embodiment to be next described illustrates an example in which a display pattern in the focus guide mode is different from that of the abovementioned third embodiment. A basic configuration of an image pickup apparatus (camera) itself of the present embodiment is substantially similar to that of the abovementioned first embodiment, and only part of a camera control sequence differs. Therefore, with respect to components similar to those of the abovementioned first embodiment, illustration will be omitted and description will be made with the same reference characters. In addition, with respect to a similar processing sequence, illustration and description will be omitted, and only different parts thereof will be described below.

Figure 23:
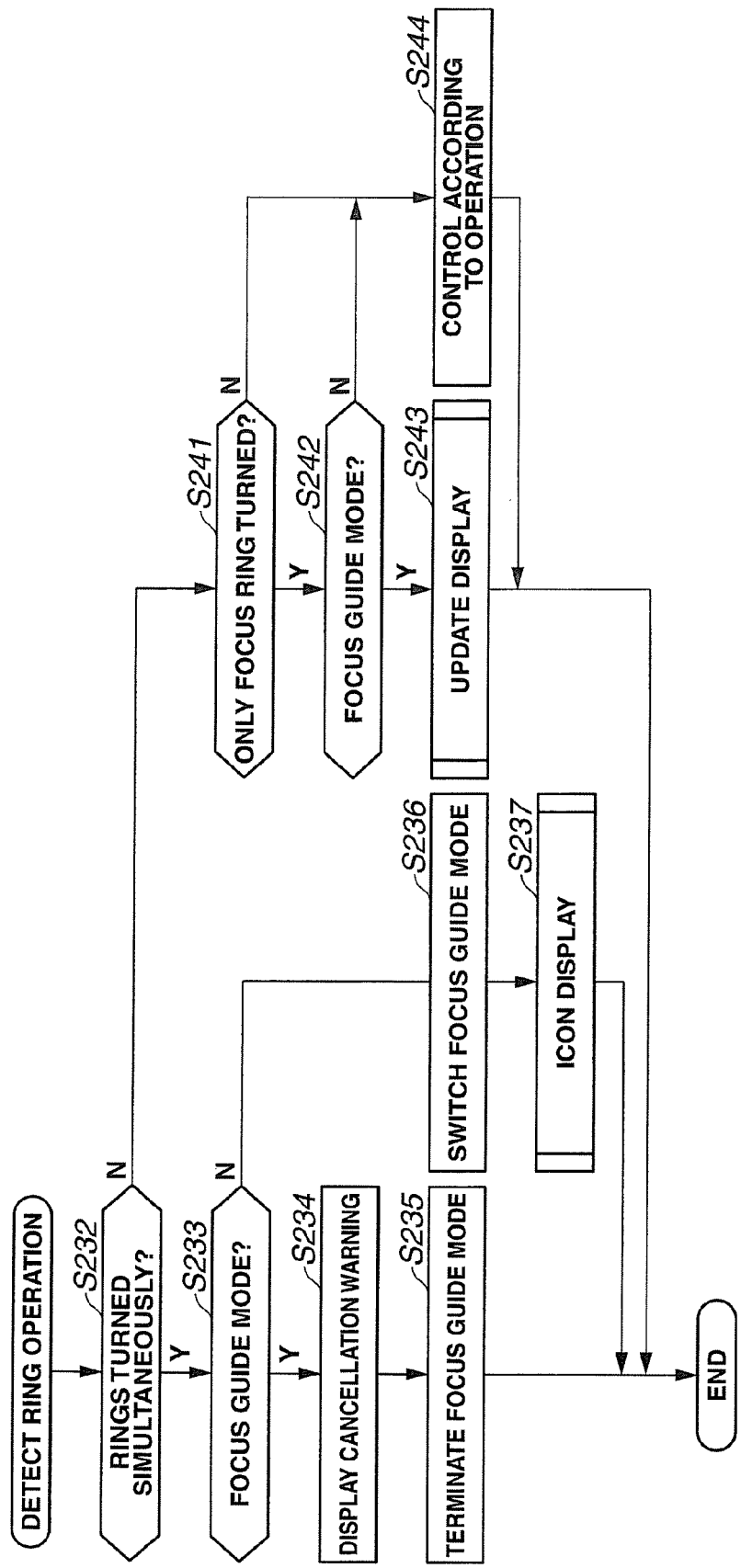
FIG. 23 is a flowchart showing in detail a subroutine of the ring operation detection processing in the camera control processing sequence in an image pickup apparatus (camera) of a fourth embodiment of the present invention.
Figure 24:
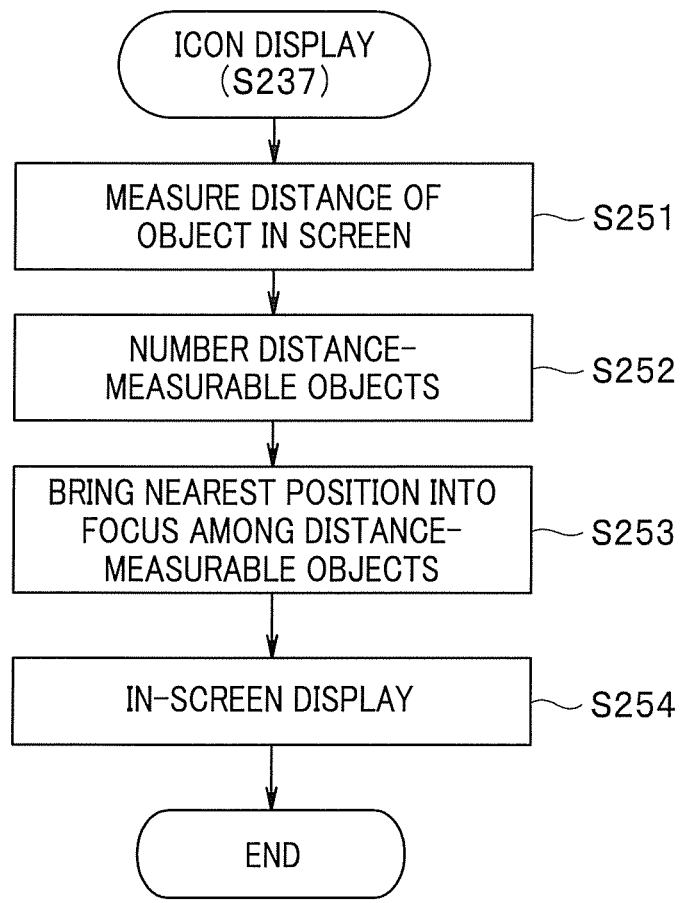
FIG. 24 is a flowchart showing the subroutine (icon display processing of step S237) in the processing sequence of FIG. 23.
Figure 25:
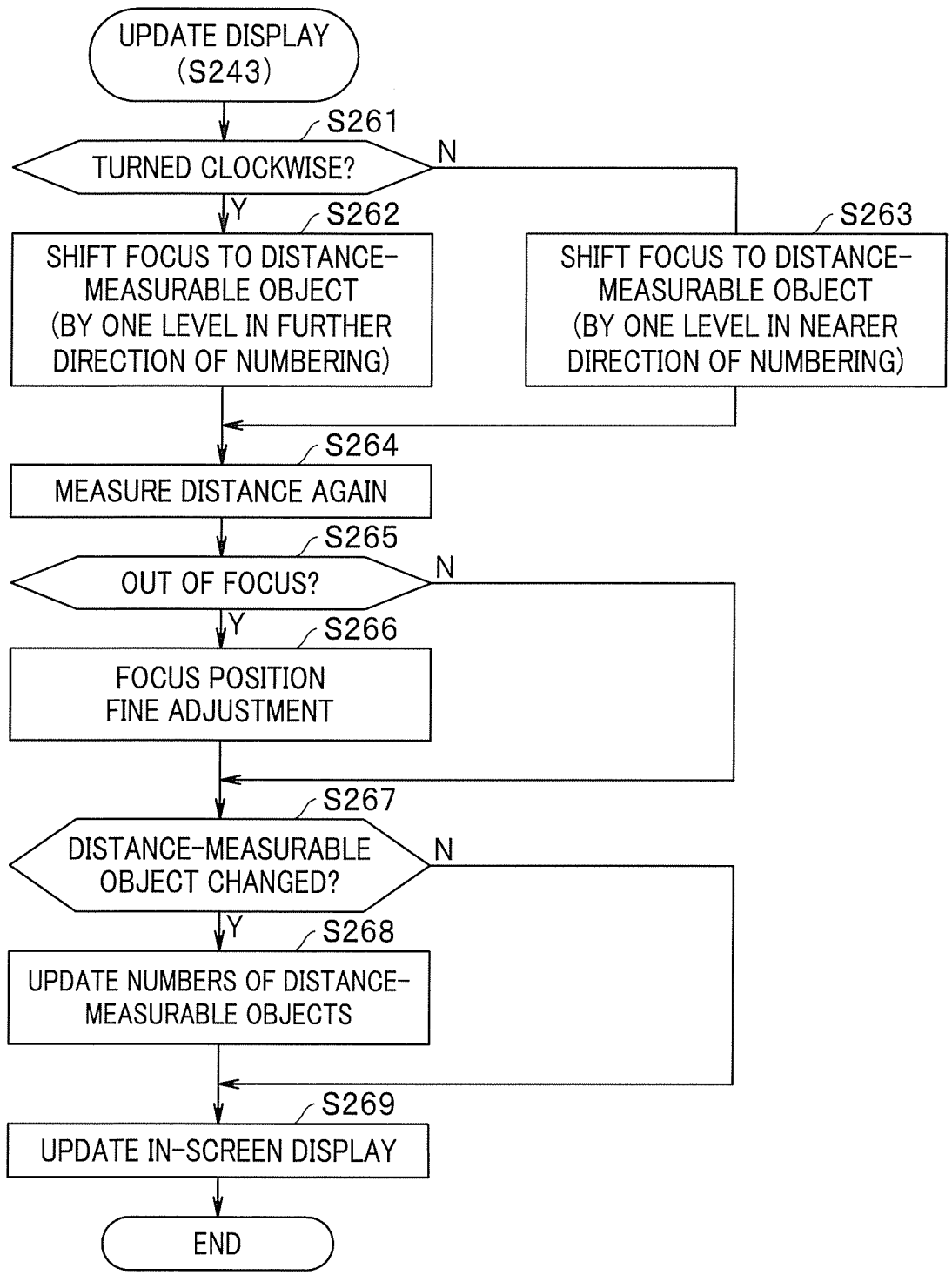
FIG. 25 is a flowchart showing the subroutine (display update processing of step S243) in the processing sequence of FIG. 23.

FIG. 23, FIG. 24, and FIG. 25 are flowcharts showing in detail subroutines of the ring operation detection processing (corresponding to the process of step S117 of FIG. 3) in the camera control processing sequence in the image pickup apparatus (camera) of the fourth embodiment of the present invention. Among these, FIG. 24 is the flowchart showing the subroutine (icon display processing of step S237) in the processing sequence of FIG. 23. FIG. 25 is the flowchart the subroutine (display update processing of step S243) in the processing sequence of FIG. 23.

Figure 26:
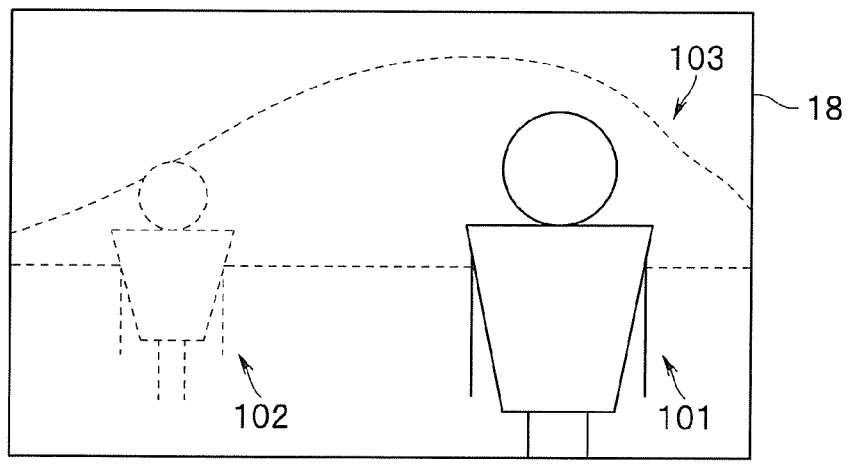
FIG. 26 is a diagram showing one example of the live view image displayed on the display section of the image pickup apparatus (camera) of the fourth embodiment of the present invention.
Figure 27:
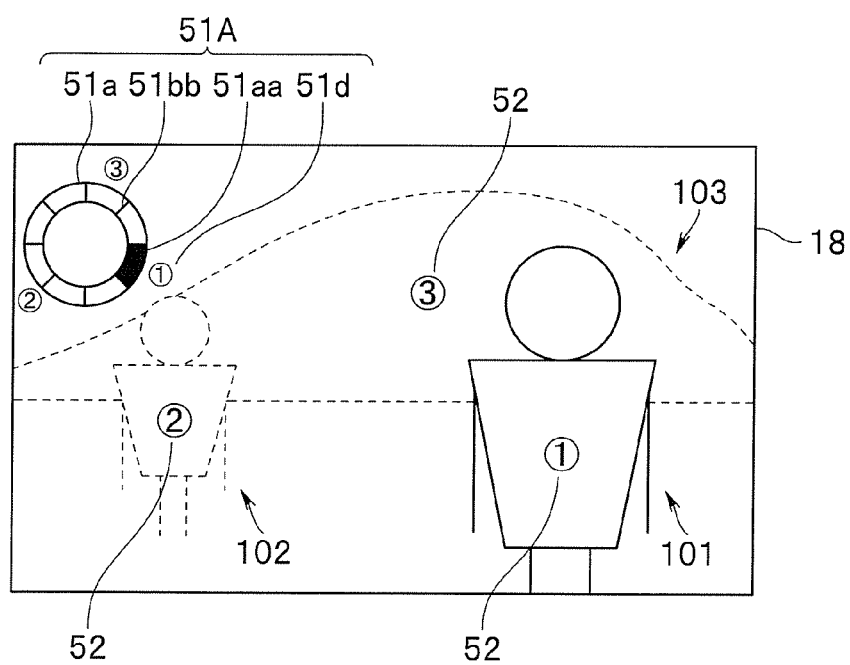
Figure 28:
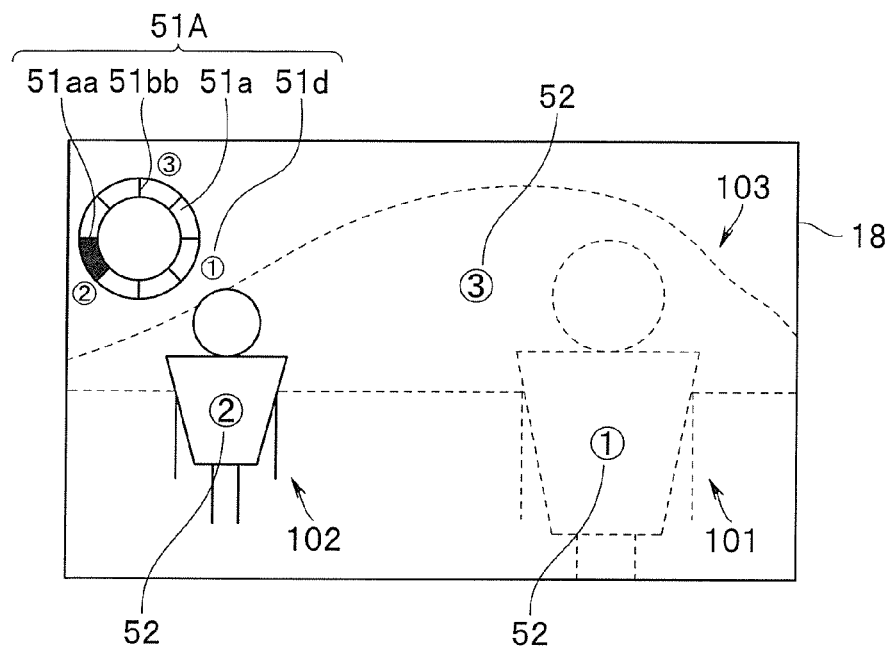
Figure 29:
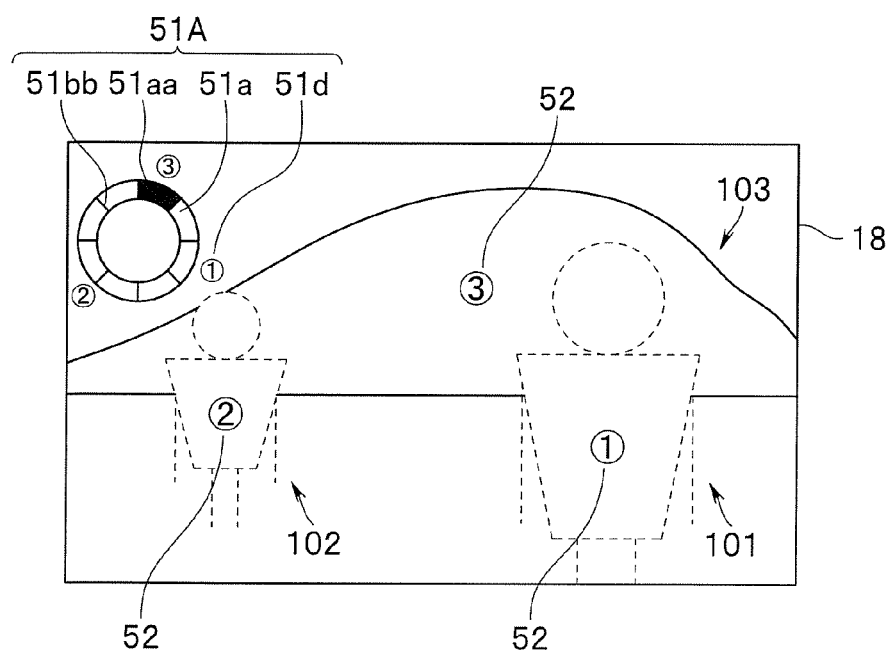

FIG. 26 to FIG. 29 are display examples of the display section in the image pickup apparatus (camera) of the present embodiment. Among these, FIG. 26 shows one example of the live view image displayed on the display section of the image pickup apparatus (camera). FIG. 27 to FIG. 29 each show one example of the live view image in the focus guide mode in the image pickup apparatus (camera). Among these, FIG. 27 shows a state where an object of the short-distance view is focused on. FIG. 28 shows a state where an object of the middle-distance view is focused on. FIG. 29 shows a state where an object of the long-distance view is focused on. Note that, in FIG. 26 to FIG. 29, as with FIG. 18 and FIG. 19 of the abovementioned third embodiment, the objects in the focused state are outlined by the solid lines, and the objects not in the focused state are outlined by the dotted lines.

In the present embodiment, as shown in the live view image of FIG. 26, a person 101 as the object in the short-distance view, another person 102 as the object in the middle-distance view, and a mountain or the like 103 as the object in the long-distance view are present within a range as the image pickup target. It is assumed that an image is picked up in the focus guide mode using the camera 1 of the present embodiment image pickup in this situation.

For the camera control processing sequence (main sequence) in the camera 1 of the present embodiment, FIG. 3 illustrated in the abovementioned first embodiment is referred to.

Then, when any one of the two operation rings 23a and 23b of the camera 1 is operated in the process of step S116 of FIG. 3, the flow proceeds to the ring operation detection processing of step S117. The ring operation detection processing in the present embodiment is the processing sequence of FIG. 23.

In step S232 of FIG. 23, the signal processing control section 11 checks whether or not the simultaneous turning operation of the above two operation rings 23a and 23b is performed, based on the detection result from the abovementioned process of step S116. Here, if it is checked that the simultaneous turning operation of the above two operation rings 23a and 23b is performed, the signal processing control section 11 prohibits a control corresponding to the turning operation of the respective operation rings 23a and 23b, and the flow proceeds to a process of next step S233. On the other hand, if it is checked that the simultaneous turning operation of the operation rings is not performed, the flow proceeds to a process of step S241. Note that, the process of this step S232 is similar to the process of step S201 of FIG. 17.

In step S233, the signal processing control section 11 checks whether or not the focus guide mode is currently set. Here, if the focus guide mode is already currently set, the flow proceeds to a process of step S234. On the other hand, if it is checked that the focus guide mode is not currently set, the flow proceeds to a process of step S236. Note that, the process of this step S233 is similar to the process of step S211 of FIG. 17.

In step S234, the signal processing control section 11 controls the display section 18 via the display control section 11d to display a warning of the cancellation the focus guide mode.

Next, in step S235, the signal processing control section 11 cancels the currently set focus guide mode to terminate the focus guide mode, and sets another focus mode, for example, the focus mode of normal AF control processing. This sequence is thereafter terminated, and the flow returns to the original processing sequence (FIG. 3).

On the other hand, in step S236, the signal processing control section 11 switches the focus control to the focus guide mode. Note that the process of this step S236 is similar to the process of step S220 of FIG. 17.

Next, in step S237, the signal processing control section 11 performs icon display processing. This icon display processing will be next described in detail with reference to FIG. 24.

In step S251 of FIG. 24, the signal processing control section 11 performs distance measurement action processing (this may be the distance distribution determination converted from a focus position) with respect to a plurality of objects in the screen. This distance measurement action processing is substantially similar to the abovementioned process of step S222 of FIG. 17. Note that this distance measurement (object distribution determination) processing includes the abovementioned processes of steps S221 and S223 of FIG. 17, although illustration and description thereof will be omitted.

In step S252, the signal processing control section 11 performs numbering processing to a plurality of objects (written as distance-measurable objects in FIG. 24) that are determined to be able to be subjected to distance measurement (distance distribution determination, object distribution determination) based on the distance measurement result obtained in the abovementioned process of step S251. This numbering processing is, for example, processing to number the plurality of objects detected within a range as the image pickup target in an ascending order of distance, and to display numbering icons 52 using numbers or the like in the vicinities of corresponding objects. In the example shown in FIG. 27 to FIG. 29, a number "1" is allocated to the short-distance view object 101, a number "2" is allocated to the middle-distance view object 102, and a number "3" is allocated to the long-distance view object 103.

Note that although FIG. 27 to FIG. 29 show the state where the focus guide icon 51A and the numbering icons 52 are displayed, display processing of these is performed in the process of step S254 to be described hereafter.

Next, in step S253 of FIG. 24, the signal processing control section 11 performs the focus adjustment (focus movement) to the short-distance view object 101 that is at the nearest position out of the objects (distance-measurable objects) detected by the abovementioned distance measurement action. The display state of the display section 18 at this point in time is shown in FIG. 27.

Next, in step S254, the signal processing control section 11 controls the display section 18 via the display control section 11d to perform in-screen display. Here, the focus guide icon 51A and numbering icons 52 are displayed. The focus guide icon 51A is basically a form substantially similar to that of the abovementioned third embodiment, and is constituted by the annular portion 51a and numbering indicators 51d. In the present embodiment, a plurality of indicators 51bb are displayed in such a manner as to divide the annular portion 51a, instead of the plurality of indicators 51b. The identification portion 51aa clearly indicates one of the plurality of indicators 51bb by, for example, displaying in a different color or the like. Then, the numbering indicators 51d are displayed on a periphery of the annular portion 51a. These numbering indicators 51d are numeric icons corresponding to the objects that are numbered based on the distance measurement result (object distribution determination result). Note that, in the present embodiment, the arrows 51c are omitted. In addition, the numbering icons 52 are icons formed by numbers or the like that are displayed at areas in the vicinities of the objects numbered based on the distance measurement result.

On the other hand, if it is checked that the operation of the operation ring detected in the abovementioned process of step S116 is not the simultaneous turning operation in the abovementioned process of step S232 and the flow proceeds to a process of step S241, in this step S241, the signal processing control section 11 checks whether or not a turning operation of only the focus ring 23a is performed. Here, if the turning operation of only the focus ring 23a is checked, the flow proceeds to a process of next step S242. On the other hand, if the turning operation of only the focus ring 23a is not performed, that is, a turning operation of only the zoom ring 23b out of the two operation rings is checked, the flow proceeds to a process of step S244.

In step S242, the signal processing control section 11 checks whether or not the current focus control is set to the focus guide mode. Here, if the focus guide mode is currently set, the flow proceeds to a process of step S243. On the other hand, if the focus guide mode is not currently set, the flow proceeds to a process of step S244.

In step S243, the signal processing control section 11 controls the display section via the display control section 11d to perform display update processing (refer to FIG. 25 for details). This subsequence is thereafter terminated, and the flow returns to the original processing sequence (FIG. 3).

In step S244, the signal processing control section 11 performs drive control corresponding to the operated operation ring, that is, the normal focus control or zoom control. This subsequence is thereafter terminated, and the flow returns to the original processing sequence (FIG. 3).

Next, the display update processing being the abovementioned process of step S243 will be next described below in detail.

In step S261 of FIG. 25, the signal processing control section 11 receives a signal from the first turning detection section 27a to check whether or not the turning direction of the focus ring 23a is clockwise turning. Here, if the clockwise turning operation is checked, the flow proceeds to a process of step S262. On the other hand, if a counterclockwise turning operation is checked, the flow proceeds to a process of step S263.

In step S262, the focus processing section 11a of the signal processing control section 11 controls the focus drive section 24b via the communication sections 12 and 22, and the lens control section 21 to cause the focus drive mechanism section 26b to drive the focus optical system, and shifts the focused state from the object that is currently in the focused state to an object by one level in a further direction of numbering. The flow thereafter proceeds to a process of step S264. Thereby, the live view image of the display section 18 changes, for example, from the state shown in FIG. 27 to the state shown in FIG. 28.

On the other hand, in step S263, the signal processing control section 11 shifts, as with the processing of step S262, the focused state from the object that is currently in the focused state to an object by one level in a nearer direction of numbering. The flow thereafter proceeds to a process of step S264. In this case, the live view image of the display section 18 changes from the state shown in FIG. 28 to the state shown in FIG. 27.

Note that, in the present embodiment, although the focused state is shifted "by one level in the further direction" in the case of "clockwise", and shifted "by one level in the nearer direction" in the case of "counterclockwise", this is merely an exemplification and is not limited thereto. For example, conversely, the focused state may be shifted "by one level in the further direction" in the case of "counterclockwise", and shifted "by one level in the nearer direction" in the case of "clockwise".

In step S264, the signal processing control section 11 performs the distance measurement action processing again. This distance measurement action processing is similar to the abovementioned process of step S251 of FIG. 24.

Next, in step S265, the signal processing control section 11 checks whether or not an out-of-focus occurs, based on the result form the abovementioned distance measurement action processing of step S264. Here, if the out-of-focus is checked, the flow proceeds to a process of next step S266, in this step S266, the signal processing control section 11 controls the focus drive section 24b to drive the focus optical system, and perform a fine adjustment action of the focus position. The flow thereafter proceeds to a process of step S267. On the other hand, if the out-of-focus is not checked in the abovementioned process of step S264, the flow proceeds to a process of step S267.

In step S267, the signal processing control section 11 checks a state in the image pickup screen based on a result from the abovementioned distance remeasurement processing of step S264, and determines whether or not the distance-measurable objects have changed. Here, if it is checked that the distance-measurable objects have changed, the flow proceeds to a process of step S268, in this step S268, the signal processing control section 11 performs processing to update the numbering of the distance-measurable objects detected based on a result from the distance remeasurement processing. The flow thereafter proceeds to a process of step S269. On the other hand, if it is checked that the distance-measurable objects have not changed, in the abovementioned process of step S267, the flow proceeds to a process of step S269. Here, it is needless to say that the term "distance measurement" is not necessarily to measure a distance to an object such as some meters or some tens of meters, but may be a measurement converted from the focusing information on the lens such as which position to be focused to obtain an optimal focus. It is important to determine which position to move the focusing lens to focus on which object, rather than to accurately measure a distance. As the above image pickup parameter, an example of focusing is illustrated here, and the effect of the focusing corresponds to a position (object) on the above display section. A distance distribution determination section for calculating the distance distribution of respective objects is provided. That is, here, the respective object positions are determined in association with the above distance distribution, and are converted as coordinates on the display section. Since the above display control section displays a direction or a rotation position of the rotational operation, the user can perform the rotational operation without confusing. The user can understand what the user can do with the rotational operation. There is no need to worry about failing in the rotational operation.

Lastly, in step S269, the signal processing control section 11 controls the display section 18 via the display control section 11d to perform processing to update the in-screen display. This subsequence is thereafter terminated, and returns to the original processing sequence (FIG. 23).

As described above, according to the above fourth embodiment, the advantages similar to those of the abovementioned third embodiment can be obtained. In addition, the display on the display section 18 is simplified by devising a form of the focus guide icon 51A, which can prevent the live view image in the focus guide mode from being complicated.

Note that, in the present embodiment, the operation in the focus guide mode is performed using the focus ring 23a, but is not limited thereto, as with the abovementioned respective embodiments, the operation may be configured to be performed by a touch and slide operation or the like to the touch panel 18*b*.

The description has been made, in such a manner, mostly about the image pickup, but this means that the image pickup section can perform the focus adjustment or scaling display adjustment, and a parameter in displaying or observing may be changed. As a matter of course, a parameter may be that of change in a contrast or a color, or that of image processing. Then, the signal processing control section is provided as a parameter control section for performing a control of the above display parameter and the observation parameter. Although the operation ring is described, the operation ring is called a rotational operation member, typically including a dial, and may be provided anywhere in the system. In addition, the electric view finder is described, an LCD panel or an OEL panel may be used, and may be a display section for visibly displaying an image signal outputted from the image pickup section. On the display section, the effect of the above change in the parameter in accordance with the rotational operation can be displayed by the display control section so as to be superimposed on the image signal outputted from the image pickup section. The user can thereby understand well how to operate the operation section because the effect to be provided by the operation of the operation member is displayed and the user can intuitively confirm the effect by looking at the display. In particular, the display section can display the rotation position of the operation in such a manner as to correspond to two-dimensional space or a two-dimensional coordinate on a display section surface, as long as the rotational operation is centered about the optical axis of the lens section and the optical system, or the rotational operation uses an image pickup direction or an observation direction as the rotation center, which doubles the effect.

Note that the present invention is not limited to the abovementioned respective embodiments, and it is needless to say that various modifications and applications can be made without departing from the scope of the invention. Although the mirrorless interchangeable-lens camera is described, the camera does not need to be an interchangeable-lens camera, and may be a single-lens reflex camera that can perform electronic display. Moreover, the above respective embodiments include inventions in various stages, and various inventions can be extracted by an appropriate combination of a plurality of disposed components. For example, even if several components are omitted from all the components shown in the above respective embodiments, a configuration in which the several components are omitted can be extracted as an invention as long as the problem to be solved by the invention can be solved and the advantages of the invention can be obtained. Furthermore, components in the different embodiments may be appropriately combined. The present invention is not limited by a specific embodiment except by the appended claims.

With respect to the respective processing sequences described in the abovementioned respective embodiments, a procedure thereof is allowed to be changed unless contrary to the nature thereof. Therefore, with respect to the abovementioned processing sequence, for example, an execution sequence of the respective processing steps may be changed, a plurality of process steps may be simultaneously executed, and the sequence of the respective process steps may differ every time a series of processing sequences are executed.

That is, even if phrases such as "first" or "next" are used in descriptions for convenience in the action flow in the clams, specification, or drawings, this does not necessarily mean that the action must be performed in that order. Furthermore, it is needless to say that the respective steps configuring these action flows can be appropriately omitted, as far as they do not influence the nature of the invention.

Furthermore, among the techniques described here, many of the controls or the functions that are mainly described with the flowcharts can be set by a software program, and the program is read and executed by a computer, which can achieve the abovementioned controls or functions. The entire and part of the program can be stored, as a computer program product, in a portable medium such as a flexible disk, CD-ROM, and a nonvolatile memory, or in a storage medium such as a hard disk and a volatile memory, and can be distributed or provided at product shipment, or via the portable media or a communication line. The user downloads the program over a communication network and installs the program in a computer, or installs the program from the storage medium to the computer, which can easily implement the image pickup apparatus of the present embodiments.

According to the above embodiments of the present invention, the invention having the following configurations can be obtained.

(1) An image pickup apparatus including:

an image pickup section that is constituted by an image pickup optical system for forming an optical image of an object and an image pickup device for performing photoelectric conversion upon receiving the optical image of the object to output an image signal;

a display section for visibly displaying the image signal outputted from the image pickup section;

an operation member for performing a zooming operation;

zoom control means for enlarging or reducing the object image; and a signal processing control section for performing display control of the display section and the zoom control upon receiving the image signal outputted from the image pickup section and a specified operation signal, wherein the signal processing control section performs fine adjustment of the zoom control within a range displayed on the display section.

(2)

The image pickup apparatus according to the above (1), wherein the above specified operation is a specified ring operation.

(3)

The image pickup apparatus according to the above (1), further including a touch panel on the display section, wherein the specified operation is an operation of the touch panel.

(4)

The image pickup apparatus according to the above (1), wherein display showing a range for performing the fine adjustment is display showing a size of an object within an image pickup frame.

(5)

The image pickup apparatus according to the above (3), wherein the display showing the range for performing the fine adjustment is display showing a range that is touched on the touch panel.

(6)

A method of controlling an image pickup apparatus in which an image pickup section forms an optical image of an object by an image pickup optical system, and receives light of the optical image of the object and performs photoelectric conversion by an image pickup device to output an image signal, a display section visibly displays the image signal outputted from the image pickup section, an operation member performs a zooming operation, zoom control means performs zoom control for enlarging or reducing the object image, and a signal processing control section receives the image signal outputted from the image pickup section and a specified operation signal to perform display control of the display section and the zoom control, and performs fine adjustment of the zoom control within a range displayed on the display section.

(7)

An image pickup apparatus including:

an image pickup section that is constituted by an image pickup optical system for forming an optical image of an object and an image pickup device for performing photoelectric conversion upon receiving the optical image of the object to output an image signal;

focus driving means for performing position adjustment of the image pickup optical system;

a plurality of operation members including an operation member for performing an operation for the focus driving; and a signal processing control section for receiving an instruction signal from the operation member to perform image pickup parameter control, wherein the signal processing control section switches among relationships between an amount of operation and a value of parameter, upon receiving a simultaneous operation instruction signal of at least two operation members out of the plurality of above operation members.

(8)

The image pickup apparatus according to the above (7), wherein the signal processing control section further prohibits normal controls in accordance with operation instruction of each of the above two operation members.

(9)

The image pickup apparatus according to the above (7), wherein the signal processing control section further switches control in accordance with an amount of operation instruction of any one of the above two operation members from control of a linear relationship to that of a nonlinear relationship.

(10)

The image pickup apparatus according to the above (7), wherein the signal processing control section further switches among auxiliary displays in accordance with any one of the operation instructions of the above two operation members.

(11)

The image pickup apparatus according to the above (7), wherein the signal processing control section sets a plurality of focus zones based on object distance distribution determination, and performs switching to image pickup parameter control by a focus zone specification operation instruction signal from the above operation members.

(12)

A method of controlling an image pickup apparatus in which an image pickup section forms an optical image of an object by an image pickup optical system, and receives light of the optical image of the object and performs photoelectric conversion by an image pickup device to output an image signal, focus drive means performs position adjustment of the image pickup optical system, an operation member performs an operation for the focus driving, a signal processing control section performs image pickup parameter control to switch among relationships between an amount of operation and a value of parameter upon receiving a simultaneous operation instruction signal of at least two operation members out of the plurality of above operation members.

INDUSTRIAL APPLICABILITY

The present invention is not limited to image pickup apparatuses being electronic apparatuses such as digital cameras, which are specialized in an image pickup function, and can be widely applied to other forms of electronic apparatuses having an image pickup function, such as cellular phones, smartphones, recording apparatuses, electronic organizers, personal computers, tablet terminal apparatuses, game apparatuses, portable televisions, timepieces, navigation apparatuses using the GPS (global positioning system), and various electronic apparatuses with an image pickup function.

Furthermore, the present invention can be applied also to electronic apparatuses having a function of obtaining an image using the image pickup device, and displaying the obtained image on a display device, such as observation apparatuses including telescopes, binoculars, and microscopes. That is, it is possible to provide a method for intuitively controlling a parameter by a simple operation in various apparatuses, and image pickup apparatuses, observation apparatuses, and display apparatuses that include the method of controlling.

What is claimed is:

1. An image pickup apparatus comprising:
an image pickup section that operates in accordance an image pickup parameter;
a display section that displays an image signal output from the image pickup section;
a rotational operation member that receives manual user rotational input;
a controller that (1) sets a range over which the image pickup parameter can be adjusted via the rotational operation member, and (2) changes the image pickup parameter, within the set range, responsive to manual user rotational input received by the rotational operation member, wherein the range is set based on either (A) at least one user input, or (B) long and short measured distances; and
a display control section that displays on the display section, a ring shaped icon that is associated with the image pickup parameter and visually indicates an effect of a change of the image pickup parameter in accordance with the manual user rotational input received by the rotational operation member,
wherein the display control section further displays on the display section and adjacent to the ring shaped icon, (1) a first window displaying a first representation of the image signal corresponding to a telephoto side of the range, and (2) a second window displaying a second representation of the image signal corresponding to a wide-angle side of the range.

2. The image pickup apparatus according to claim 1, wherein the image pickup parameter corresponds to a position on the display section displaying an object on which to focus.

3. The image pickup apparatus according to claim 2, further comprising:
a touch panel disposed on a display surface of the display section, wherein
the position on the display section is equivalent to a position of a touch operation on the touch panel.

4. The image pickup apparatus according to claim 2, further comprising:
a distance distribution determination section that calculates a distance distribution of respective objects positioned within the image signal output from the image pickup section, wherein
the position on the display section is equivalent to an object position associated with the distance distribution, and the distance distribution includes both the long measured distance and the short measured distance.

5. The image pickup apparatus according to claim 1, wherein the display control section displays at least one of (A) a rotation direction of a rotational operation corresponding to the manual user rotational input received or (B) a rotation position of the rotational operation corresponding to the manual user rotational input received.

6. The image pickup apparatus of claim 1 wherein the image pickup parameter is a position in an optical axis direction of a lens group.

7. A method of controlling an image pickup apparatus, comprising the steps of:
obtaining an image signal by an image pickup section operating in accordance with an image pickup parameter;
displaying the image signal output from the image pickup section, by a display section;
setting a range over which the image pickup parameter can be adjusted via a rotational operation member, wherein the range is set based on either (A) at least one user input, or (B) long and short measured distances;
changing the image pickup parameter, within the set range, in accordance with a manual user rotational operation of the rotational operation member;
displaying, on the display section, a ring shaped icon that is associated with the image pickup parameter and visually indicates an effect of a change to the image pickup parameter in accordance with the manual user rotational operation of the rotational operation member; and
displaying, on the display section and adjacent to the ring shaped icon, (1) a first window displaying a first representation of the image signal corresponding to a telephoto side of the range, and (2) a second window displaying a second representation of the image signal corresponding to a wide-angle side of the range.

8. The method of claim 7 wherein the image pickup parameter is a position in an optical axis direction of a lens group.

9. A non-transitory computer-readable storage medium storing an image pickup control program of an image pickup apparatus which, when executed by the image pickup apparatus, performs a method comprising:
obtaining an image signal by an image pickup section operating in accordance with an image pickup parameter;
displaying the image signal output from the image pickup section, by a display section;
setting a range over which the image pickup parameter can be adjusted via a rotational operation member, wherein the range is set based on either (A) at least one user input, or (B) long and short measured distances;
changing the image pickup parameter, within the set range, in accordance with a manual user rotational operation of the rotational operation member;
displaying, on the display section, a ring shaped icon that is associated with the image pickup parameter and visually indicates an effect of a change to the image pickup parameter in accordance with the manual user rotational operation of the rotational operation member; and
displaying, on the display section and adjacent to the ring shaped icon, (1) a first window displaying a first representation of the image signal corresponding to a telephoto side of the range, and (2) a second window displaying a second representation of the image signal corresponding to a wide-angle side of the range.

10. The non-transitory computer-readable storage medium of claim 9, wherein the image pickup parameter is a position in an optical axis direction of a lens group.

11. An apparatus comprising:
an image pickup system including an image pickup optical system and an image pickup device, and operating in accordance with an image pickup parameter;
a user operation section receiving manual user rotational input;
a controller that (1) sets a range over which the image pickup parameter can be adjusted via the rotational operation member, and (2) changes the image pickup parameter, within the set range, responsive to manual user rotational input received by the user operation section, wherein the range is set based on either (A) at least one user input, or (B) long and short measured distances; and
a display control section that generates a ring shaped icon that is associated with the image pickup parameter, and visually indicates the changes to the image pickup parameter by the controller responsive to the manual user rotational input received by the user operation section; and
a display section displaying the ring shaped icon superimposed on an image derived from signals output by the image pickup device,
wherein the display control section further displays on the display section and adjacent to the ring shaped icon, (1) a first window displaying a first representation of the image signal corresponding to a telephoto side of the range, and (2) a second window displaying a second representation of the image signal corresponding to a wide-angle side of the range.

12. The apparatus of claim 11 wherein the controller sets the range over which the image pickup parameter can be adjusted via the rotational operation member, based on the at least one user input, and
wherein the image pickup parameter associated with the ring shaped icon is a fine zoom adjustment for the image pickup optical system.

13. The apparatus of claim 11 wherein the controller sets the range over which the image pickup parameter can be adjusted via the rotational operation member, based on the long and short measured distances, and
wherein the image pickup parameter associated with the ring shaped icon is a focus guide for defining an object, within the image, on which to focus.

14. The apparatus of claim 11 wherein the image pickup parameter is a position in an optical axis direction of a lens group.

* * * * *